(12) United States Patent     (10) Patent No.: US 11,900,543 B2
Lacey et al.     (45) Date of Patent: *Feb. 13, 2024

(54) TESSELLATION METHOD USING DISPLACEMENT FACTORS

(71) Applicant: Imagination Technologies Limited, Kings Langley (GB)

(72) Inventors: Peter Malcolm Lacey, Buckinghamshire (GB); Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,449

(22) Filed: Oct. 19, 2022

(65) Prior Publication Data

US 2023/0066361 A1    Mar. 2, 2023

Related U.S. Application Data

(63) Continuation of application No. 17/061,721, filed on Oct. 2, 2020, now Pat. No. 11,501,494, which is a continuation of application No. 16/255,627, filed on Jan. 23, 2019, now Pat. No. 10,832,473, which is a continuation of application No. 15/174,035, filed on Jun. 6, 2016, now Pat. No. 10,229,536.

(30) Foreign Application Priority Data

Jun. 5, 2015 (GB) ................................. 1509762

(51) Int. Cl.
    *G06T 17/20*        (2006.01)
    *G06T 15/00*        (2011.01)
    *G06T 15/80*        (2011.01)

(52) U.S. Cl.
CPC ............ *G06T 17/20* (2013.01); *G06T 15/005* (2013.01); *G06T 15/80* (2013.01); *G06T 17/205* (2013.01)

(58) Field of Classification Search
None
See application file for complete search history.

(56) References Cited

U.S. PATENT DOCUMENTS 6,940,505 B1    9/2005   Savine et al.
8,605,085 B1    12/2013   Moreton
(Continued)

FOREIGN PATENT DOCUMENTS

CN        102214369 A    10/2011
GB          2388507 A    11/2003

*Primary Examiner* — Kyle Zhai

(74) *Attorney, Agent, or Firm* — Potomac Law Group, PLLC; Vincent M DeLuca

(57) ABSTRACT

A tessellation method uses both vertex tessellation factors and displacement factors defined for each vertex of a patch, which may be a quad, a triangle or an isoline. The method is implemented in a computer graphics system and involves calculating a vertex tessellation factor for each corner vertex in one or more input patches. Tessellation is then performed on the plurality of input patches using the vertex tessellation factors. The tessellation operation involves adding one or more new vertices and calculating a displacement factor for each newly added vertex. A world space parameter for each vertex is subsequently determined by calculating a target world space parameter for each vertex and then modifying the target world space parameter for a vertex using the displacement factor for that vertex.

20 Claims, 18 Drawing Sheets

(56) References Cited

U.S. PATENT DOCUMENTS

| | | |
|---|---|---|
| 9,147,288 B1 | 9/2015 | Johnston et al. |
| 2004/0196285 A1 | 10/2004 | Rice et al. |
| 2009/0237400 A1 | 9/2009 | Patel et al. |
| 2014/0210819 A1 | 7/2014 | Mei et al. |
| 2015/0015580 A1 | 1/2015 | Kim et al. |
| 2015/0221131 A1 | 8/2015 | Luo et al. |

(1, 1, 1, 1, 2)

(3, 3, 3, 3, 6)

(1, 5, 1, 5, 6)

(1, 1, 1, 2)

(5, 5, 5, 0)

(1, 5, 5, 6)

TESSELLATION METHOD USING DISPLACEMENT FACTORS

BACKGROUND

Tessellation is a technique used in computer graphics to divide up a surface in a 3-D scene into a number of smaller and simpler pieces, (referred to as primitives), typically triangles, which are more amenable to rendering. For example, the surface may represent an object in the scene. The resulting tessellated surface is generally an approximation to the original surface, but the accuracy of this approximation can be improved by increasing the number of generated primitives, which in turn usually results in the primitives being smaller. The amount of tessellation/sub-division is usually determined by a specified level of detail (LOD). An increased number of primitives is therefore typically used where a higher level of detail is required, e.g. because an object is closer to the viewer and/or the object has a more intricate shape. However, use of larger numbers of triangles increases the processing effort required to render the scene.

The sub-division into triangle primitives is typically performed on patches which are square or triangular in shape (i.e. a quad or a triangle) and which may be curved to fit to the surface of the object they represent (and hence may be referred to as 'surface-patches') and/or have displacement mapping applied. The sub-division, however, is not performed on surface-patches but is instead performed in the domain of a two dimensional patch (i.e. the patch is planar rather than being defined by a polynomial equation) which may be defined in terms of (u, v) parameters and referred to as 'parametric space'. This means that the tessellation process is independent of any curvature present in the final surface.

Tessellation may be performed ahead of time (e.g. to compute a number of different views of a scene at different levels of detail and/or from different viewpoints) or may be performed on the fly (e.g. to provide continuous or view-dependent levels of detail). With some existing tessellation methods, a user can experience undesirable visual artefacts where, although the requested level of detail is changed smoothly, the resulting tessellation changes in a discontinuous fashion.

The embodiments described below are provided by way of example only and are not limiting of implementations which solve any or all of the disadvantages of known methods and apparatus for performing tessellation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A tessellation method is described which uses both vertex tessellation factors and displacement factors defined for each vertex of a patch which may be a quad, a triangle or an isoline. The method is implemented in a computer graphics system and involves calculating a vertex tessellation factor for each corner vertex in one or more input patches. Tessellation is then performed on the one or more input patches using the vertex tessellation factors. The tessellation operation involves adding one or more new vertices and calculating a displacement factor for each newly added vertex. A world space parameter for each vertex is subsequently determined by calculating a target world space parameter for each vertex and then modifying the target world space parameter for a vertex using the displacement factor for that vertex.

A first aspect provides a method of performing tessellation in a computer graphics system, the method comprising: calculating a vertex tessellation factor for each corner vertex in one or more input patches; performing tessellation on the one or more input patches using the vertex tessellation factors to generate a plurality of primitives defined by vertices, the tessellation comprising adding one or more new vertices and calculating a displacement factor for each newly added vertex; and generating a world space parameter for each vertex by calculating a target world space parameter for each vertex and modifying the target world space parameter for a vertex using the displacement factor for that vertex.

Adding one or more new vertices may comprise: comparing a vertex tessellation factor for a pair of adjacent vertices in a patch to a threshold; and in response to determining that at least one vertex tessellation factor exceeds the threshold, adding a new child vertex which sub-divides an edge between the two adjacent vertices into two parts, the two adjacent vertices being parent vertices for the child vertex. The new child vertex may bisect the edge between the two parent vertices. Calculating a displacement factor for each newly added vertex may comprise: calculating the displacement factor for a vertex as a function of the vertex tessellation factors of the parent vertices of the vertex. The function, G(TF), of the vertex tessellation factor of the parent vertices of the vertex may be given by:

$$G(TF) = (TFmax - THRES)/\Delta, \text{ if } TFmax \in (THRES, THRES + \Delta)$$

or $$G(TF) = 1, \text{ if } TFmax \notin (THRES, THRES + \Delta)$$

where TFmax is a maximum value of the vertex tessellation factors of the parent vertices, THRES is the threshold and $\Delta$ is an amount by which vertex tessellation factors are reduced in each iteration when performing tessellation.

The method may further comprise: setting a displacement factor for each corner vertex in the one or more input patches to a maximum value of displacement factor.

Modifying the target world space parameter for a vertex using the displacement factor for that vertex may comprise: generating a starting state of the world space parameter for the vertex by interpolating between the world space parameters for the parent vertices of the vertex; and interpolating, using the displacement factor for the vertex, between the starting state of the world space parameter for the vertex and the target world space parameter for the vertex. If the displacement factor for the vertex is equal to a minimum value, the world space parameter for the vertex may be equal to the starting state of the world space parameter for the vertex and wherein if the displacement factor for the vertex is equal to a maximum value, the world space parameter for the vertex may be equal to the target state of the world space parameter for the vertex. Interpolating, using the displacement factor, df, for the vertex, between the starting state of the world space parameter for the vertex, M', and the target world space parameter for the vertex, M(u3, v3) may comprise calculating: $(1-df)*M' + df*M(u3, v3)$. Generating a starting state of the world space parameter for the vertex, M', by interpolating between the world space parameters for the parent vertices of the vertex, M(u1, v1), M(u2, v2) may comprise calculating:

$$M' = RAST\_INTERP(M(u1,v1), M(u2,v2), A)$$

where RAST_INTERP is an interpolation function used by a rasterizer in the computer graphics system and A is a constant.

Adding one or more new vertices may comprise: for an initial patch comprising a left vertex and a right vertex connected by an edge and defined in domain space: comparing a vertex tessellation factor of the left vertex and a vertex tessellation factor of the right vertex to a threshold value; in response to determining that neither of the vertex tessellation factors of the left and right vertices exceed the threshold value, outputting data describing the initial patch; and in response to determining that either of the vertex tessellation factors of the left and right vertices exceed the threshold value, forming a new vertex sub-dividing the edge into two parts, calculating a vertex tessellation factor for the new vertex, dividing the initial patch to form a first new patch comprising the left vertex and the new vertex and a second new patch comprising the right vertex and the new vertex and reducing the vertex tessellation factor of each vertex in each of the newly formed patches.

The new vertex may bisect the edge. Adding one or more new vertices may further comprise: repeating the method with each newly formed patch as the initial patch. Repeating the method for each newly formed patch as the initial patch may comprise: repeating the method for each newly formed patch as the initial patch until the vertex tessellation factors of the left and right vertices in each patch do not exceed the threshold value.

Calculating a vertex tessellation factor for the new vertex may comprise: calculating a mean of the vertex tessellation factors of the left and right vertices; and setting the vertex tessellation factor for the new vertex equal to the calculated mean. The mean of the vertex tessellation factors of the left and right vertices may be given by:

$$MEAN(LEFT.TF, RIGHT.TF) = MIN(AVG(LEFT.TF, RIGHT.TF), MIN(LEFT.TF, RIGHT.TF) + INTERVAL)$$

where: LEFT.TF is the vertex tessellation factor of the left vertex, RIGHT.TF is the vertex tessellation factor of the right vertex, AVG( ) is an arithmetic mean of values within the parentheses, MIN( ) is a minimum of a list of values within the parentheses and INTERVAL is a pre-defined parameter.

Reducing the vertex tessellation factor of each vertex in each of the newly formed patches may comprise reducing each vertex tessellation factor by a pre-defined parameter, INTERVAL. The parameter INTERVAL may be 0.5. The threshold value may be zero.

The initial patch may be an isoline patch defined by two vertices, the left vertex and the right vertex.

The initial patch may be a triangle patch and wherein the triangle patch is an ordered set of three vertices: a top vertex, the right vertex and the left vertex. A patch that is divided may be a parent patch for the two newly formed patches and wherein the first new patch is an ordered set of three vertices: a top vertex which is the new vertex added to the parent patch, a right vertex which is the left vertex of the parent patch and a left vertex which is the top vertex of the parent patch and wherein the second new patch is an ordered set of three vertices: a top vertex which is the new vertex added to the parent patch, a right vertex which is the top vertex of the parent patch and a left vertex which is the right vertex of the parent patch. The method may further comprise: receiving an input patch; and generating one or more initial patches from the input patch; and repeating the method for each of the plurality of initial patches.

The input patch may be a triangle patch having three vertices and wherein generating one or more initial patches may comprise: comparing a vertex tessellation factor of each of the three vertices to a threshold value; in response to determining that none of the vertex tessellation factors exceed the threshold value, outputting data describing the input patch; and in response to determining that at least one of the vertex tessellation factors exceed the threshold value, forming a new vertex at a centre of the triangle, calculating a vertex tessellation factor for the new vertex, dividing the input patch to form three initial patches, each initial patch being a triangle patch with the new vertex as the top vertex and reducing the vertex tessellation factor of each vertex in each of the newly formed initial patches. The new vertex may be formed at a barycenter of the triangle. The three vertices of the input patch may be a top vertex, a left vertex and a right vertex and the vertex tessellation factor for the new vertex at the centre of the triangle may be calculated using: MID.TF=MEAN(TOP.TF, LEFT.TF, RIGHT.TF) where MID.TF is the vertex tessellation factor of the new vertex, TOP.TF is the vertex tessellation factor of the top vertex, LEFT.TF is the vertex tessellation factor of the left vertex and RIGHT.TF is the vertex tessellation factor of the right vertex and MEAN( ) is a mean of values within the parentheses. MEAN(TOP.TF, LEFT.TF, RIGHT.TF) may be calculated using:

$$MEAN(TOP.TF, LEFT.TF, RIGHT.TF) = MIN(AVG(TOP.TF, LEFT.TF, RIGHT.TF), MIN(TOP.TF, LEFT.TF, RIGHT.TF) + INTERVAL)$$

where: AVG( ) is an arithmetic mean of values within the parentheses, MIN( ) is a minimum of a list of values within the parentheses and INTERVAL is a pre-defined parameter.

The input patch may be a quad patch having four vertices and wherein generating one or more initial patches may comprise: forming a new vertex at a centre of the quad patch; calculating a vertex tessellation factor for the new vertex; dividing the input patch to form four initial patches, each initial patch being a triangle patch with the new vertex as the top vertex; and reducing the vertex tessellation factor of each vertex in each of the newly formed initial patches.

The input patch may a quad patch having four vertices and a centre tessellation factor and wherein generating one or more initial patches may comprise: adding five new vertices to sub-divide the input patch into four sub-input quad patches; calculating a vertex tessellation factor for each of the five newly added vertices; reducing the vertex tessellation factor of each vertex in the newly formed four sub-input patches; and for each sub-input patch: forming a new vertex at a centre of the quad patch; calculating a vertex tessellation factor for the new vertex; dividing the input patch to form four initial patches, each initial patch being a triangle patch with the new vertex as the top vertex; and reducing the vertex tessellation factor of each vertex in each of the newly formed initial patches.

The input patch may be a triangle patch having three vertices and a centre tessellation factor and wherein generating one or more initial patches may comprise: adding four new vertices to sub-divide the input patch into three sub-input quad patches; calculating a vertex tessellation factor for each of the five newly added vertices; reducing the vertex tessellation factor of each vertex in the newly formed four sub-input patches; and for each sub-input patch: forming a new vertex at a centre of the quad patch; calculating a vertex tessellation factor for the new vertex; dividing the input patch to form four initial patches, each initial patch being a triangle patch with the new vertex as the top vertex; and reducing the vertex tessellation factor of each vertex in each of the newly formed initial patches.

The four vertices of the input patch may be a top left vertex, a top right vertex, a bottom left vertex and a bottom right vertex and the vertex tessellation factor for the new vertex at the centre of the triangle may be calculated using:

MID.TF=MEAN(TLEFT.TF,TRIGHT.TF,BLEFT.TF, BRIGHT.TF)

where MID.TF is the vertex tessellation factor of the new vertex, TLEFT.TF is the vertex tessellation factor of the top left vertex, TRIGHT.TF is the vertex tessellation factor of the top right vertex, BLEFT.TF is the vertex tessellation factor of the bottom left vertex, BRIGHT.TF is the vertex tessellation factor of the bottom right vertex and MEAN( ) is a mean of values within the parentheses.

MEAN(TLEFT.TF, TRIGHT.TF, BLEFT.TF, BRIGHT.TF) may be calculated using:

MEAN(TLEFT.TF,TRIGHT.TF,BLEFT.TF, BRIGHT.TF)=MIN(AVG(TLEFT.TF, TRIGHT.TF,BLEFT.TF,BRIGHT.TF),MIN (TLEFT.TF,TRIGHT.TF,BLEFT.TF, BRIGHT.TF)+INTERVAL)

where: AVG( ) is an arithmetic mean of values within the parentheses, MIN( ) is a minimum of a list of values within the parentheses and INTERVAL is a pre-defined parameter.

Reducing the vertex tessellation factor of each vertex in each of the newly formed initial patches may comprise reducing each vertex tessellation factor by the pre-defined parameter, INTERVAL.

A second aspect provides a graphics pipeline comprising: a hardware tessellator arranged to receive data defining each corner vertex in a one or more input patches, the data including a vertex tessellation factor for each corner vertex, and comprising hardware logic arranged to perform tessellation on the plurality of input patches using the vertex tessellation factors to generate and output a plurality of primitives defined by vertices, the tessellation comprising adding one or more new vertices, and wherein the hardware tessellator further comprises hardware logic arranged to calculate a displacement factor for each newly added vertex; and a hardware blend shader arranged, for each newly added vertex, to modify a received target world space parameter for the vertex using the displacement factor for that vertex.

The graphics pipeline may further comprise: a vertex shader arranged to calculate the vertex tessellation factor for each corner vertex and to output the vertex tessellation factors to the hardware tessellator.

The graphics pipeline may further comprise: an out vertex buffer and wherein outputting the vertex tessellation factors to the hardware tessellator comprises storing the vertex tessellation factors in the out vertex buffer.

The graphics pipeline may further comprise: a domain shader arranged to calculate a target world space parameter for each vertex and to output the target world space parameters to the hardware blend shader. The graphics pipeline may further comprise: an in domain buffer and wherein outputting the target world space parameters to the hardware blend shader comprises storing the target world space parameters in the in domain buffer.

For a new vertex which bisects an edge between two parent vertices, d the hardware logic arranged to calculate a displacement factor for the newly added vertex may be arranged to calculate the displacement factor for the newly added vertex as a function of the vertex tessellation factors of the parent vertices of the vertex.

The hardware logic arranged to calculate a displacement factor for a newly added vertex may be arranged to set a displacement factor for each corner vertex in the one or more input patches to a maximum value of displacement factor.

The hardware blend shader may comprise hardware logic arranged to: generate a starting state of the world space parameter for the vertex by interpolating between the world space parameters for the parent vertices of the vertex; and interpolate, using the displacement factor for the vertex, between the generated starting state of the world space parameter for the vertex and the received target world space parameter for the vertex. If the displacement factor for the vertex is equal to a minimum value, the world space parameter for the vertex may be equal to the starting state of the world space parameter for the vertex and wherein if the displacement factor for the vertex is equal to a maximum value, the world space parameter for the vertex may be equal to the target state of the world space parameter for the vertex.

The hardware logic arranged to perform tessellation may be arranged, for an initial patch comprising a left vertex and a right vertex connected by an edge and defined in domain space, to: compare a vertex tessellation factor of the left vertex and a vertex tessellation factor of the right vertex to a threshold value; in response to determining that neither of the vertex tessellation factors of the left and right vertices exceed the threshold value, output data describing the initial patch; and in response to determining that either of the vertex tessellation factors of the left and right vertices exceed the threshold value, form a new vertex sub-dividing the edge into two parts, calculate a vertex tessellation factor for the new vertex, divide the initial patch to form a first new patch comprising the left vertex and the new vertex and a second new patch comprising the right vertex and the new vertex and reduce the vertex tessellation factor of each vertex in each of the newly formed patches.

Further aspects provide a computer readable storage medium having encoded thereon computer readable program code for defining a graphics pipeline as described herein and a computer readable storage medium having encoded thereon computer readable program code for defining a graphics pipeline configured to perform the method as described herein.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
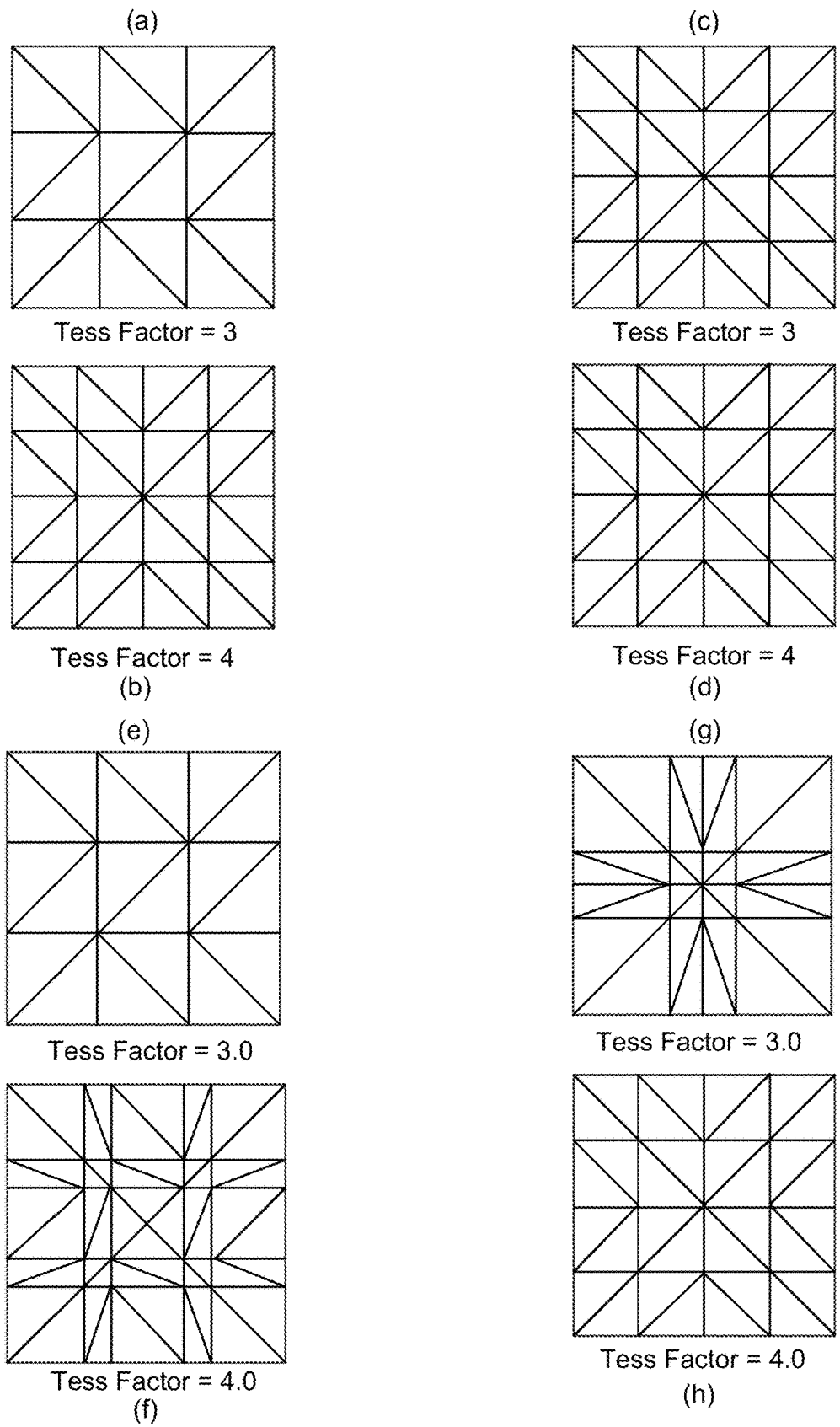
FIG. 1 shows the results of using various known tessellation methods.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

There are a number of known tessellation methods which use an edge tessellation factor (TF) which is defined for each edge of a patch (e.g. of a quad or triangle) and which determine how many times the edge (and hence the patch) should be sub-divided. FIG. 1 shows how the resulting triangles differ when using different edge tessellation factors, but the same tessellation factor for each edge.

The first four examples (a)-(d) in FIG. 1 show:
(a) Integer partitioning, edge TF=3 for all four edges
(b) Integer partitioning, edge TF=4 for all four edges
(c) Power of two integer partitioning, edge TF=3 for all four edges
(d) Power of two integer partitioning, edge TF=4 for all four edges With integer partitioning and power of two integer partitioning, the vertices along each edge are always evenly spaced; however, unwanted visual artefacts (such as popping, explained below) are very likely to occur where the sub-division level changes (as the level of detail changes) and the triangles are not tiny, but as small polygons incur additional rendering overhead, it is undesirable to make the polygons this small. The effect is particularly dramatic for power of two integer partitioning as the step size can be much larger.

The second four examples (e)-(h) in FIG. 1 show fractional partitioning methods which (unlike examples (a)-(d)) generate vertices at varying offsets:
e) Odd fractional partitioning, edge TF=3.0 for all four edges
f) Odd fractional partitioning, edge TF=4.0 for all four edges
g) Even fractional partitioning, edge TF=3.0 for all four edges
h) Even fractional partitioning, edge TF=4.0 for all four edges Some known systems avoid the 'popping' artefacts along the edges by allowing 'fractional' levels of detail (e.g. as shown in examples (e)-(h)), wherein any new vertices are initially created at the location of an existing vertex and those vertices gradually "slide" into position as the level of detail increases, as shown in FIG. 2(a) for just one edge in parameter space. Although the sudden jumps in representation are largely eliminated, such schemes can suffer from disturbing, unstable 'swimming/wobbling' artefacts, which can be exacerbated by the use of displacement mapping and this can be described with reference to FIGS. 2(b) and (c).

FIG. 2(b) shows an example displacement map cross-section and FIG. 2(c) shows how this cross-section is applied to an edge (e.g. the edges as shown in FIG. 2(a)) as the tessellation factor is changed. The arrows 201-204 show how the displacement of a vertex changes as the tessellation factor changes from 4.0 to 5.0 (arrows 201, 202) and from 5.0 to 6.0 (arrows 203, 204).

An improved method for determining parameters of vertices within a mesh is described herein which uses displacement factors to mitigate both popping and the swimming artefacts described above with reference to FIG. 2. As described in detail below, the parameters for a vertex in a mesh (where these parameters may be referred to as 'vertex member values' and may include position, normal, tangent, etc.) are displaced from a 'target' or final value based on the displacement factor of the vertex. This has the effect that when a new vertex is initially added to a mesh, its parameters are the average of the parameters of the vertex's parent vertices and then the parameters gradually change until they equal the target values. This avoids abrupt changes in values of vertex parameters which may result in unwanted visual artefacts.

The method (and hence displacement factors) may be used in combination with any tessellation method which (a) uses tessellation factors defined for each corner vertex of a domain (e.g. quad, triangle or isoline) and (b) comprises adding a plurality of new vertices where each new vertex is added at a position (in domain space) which sub-divides an edge connecting two existing vertices into two parts (which in some examples may be equal parts such that the new vertex bisects the edge). A newly added vertex may be referred to as the child vertex and the two existing vertices may be referred to as the parent vertices. These tessellation factors for vertices are referred to as 'vertex tessellation factors' to distinguish them from the edge tessellation factors used in the known methods described above and an example tessellation method which uses vertex tessellation factors is described below with reference to FIGS. 6-16.

In this description, a surface patch refers to a, usually finite, N-dimensional surface (or in the case of an isoline, an N-dimensional curve segment) which is the result of applying a parametric mapping function to a bounded 2D domain, which is either a quadrilateral or a triangle, (or in the case of an isoline, a 1 D line segment). The resulting surface or isoline can be considered N-dimensional as it may include not only 3 (or 4) dimensions for Cartesian (or homogeneous) spatial positioning, but also other parameters such as texture coordinates. As described above, surface patches may be curved to fit to the surface of the object they represent and/or have displacement mapping applied. Tessellation (i.e. the sub-division of patches), however, is not performed in 'world space' (i.e. it is not performed on curved surface patches) but is instead performed in domain space (which may also be referred to as parametric space or parameter space) in which any position in the domain can be described by two coordinates (u, v) known as the domain space coordinates, which means that the tessellation process is independent of any curvature present in the final surface (although the user may take this curvature into account when determining the tessellation factors).

When describing tessellation methods in the following description the term 'patch' is used to refer to an ordered set of two, three or four vertices (for an isoline, triangle or quad respectively) which bound a domain. The term 'domain' therefore refers to the two-dimensional space bounded by the vertices of a patch. The term 'vertex' is used generally to describe a location plus other attributes, where these attributes differ depending upon the context. For example, input control points and output vertices from a domain shader comprise a 3D position plus other parameters such as the normal, tangent, texture, etc., whereas the vertices within the tessellator (i.e. those used within the tessellation method) comprise a domain space coordinate and a vertex tessellation factor. These vertices within the tessellator are therefore not the same as the input control points or the resulting N-dimensional vertices that form the final triangles.

Figure 3:
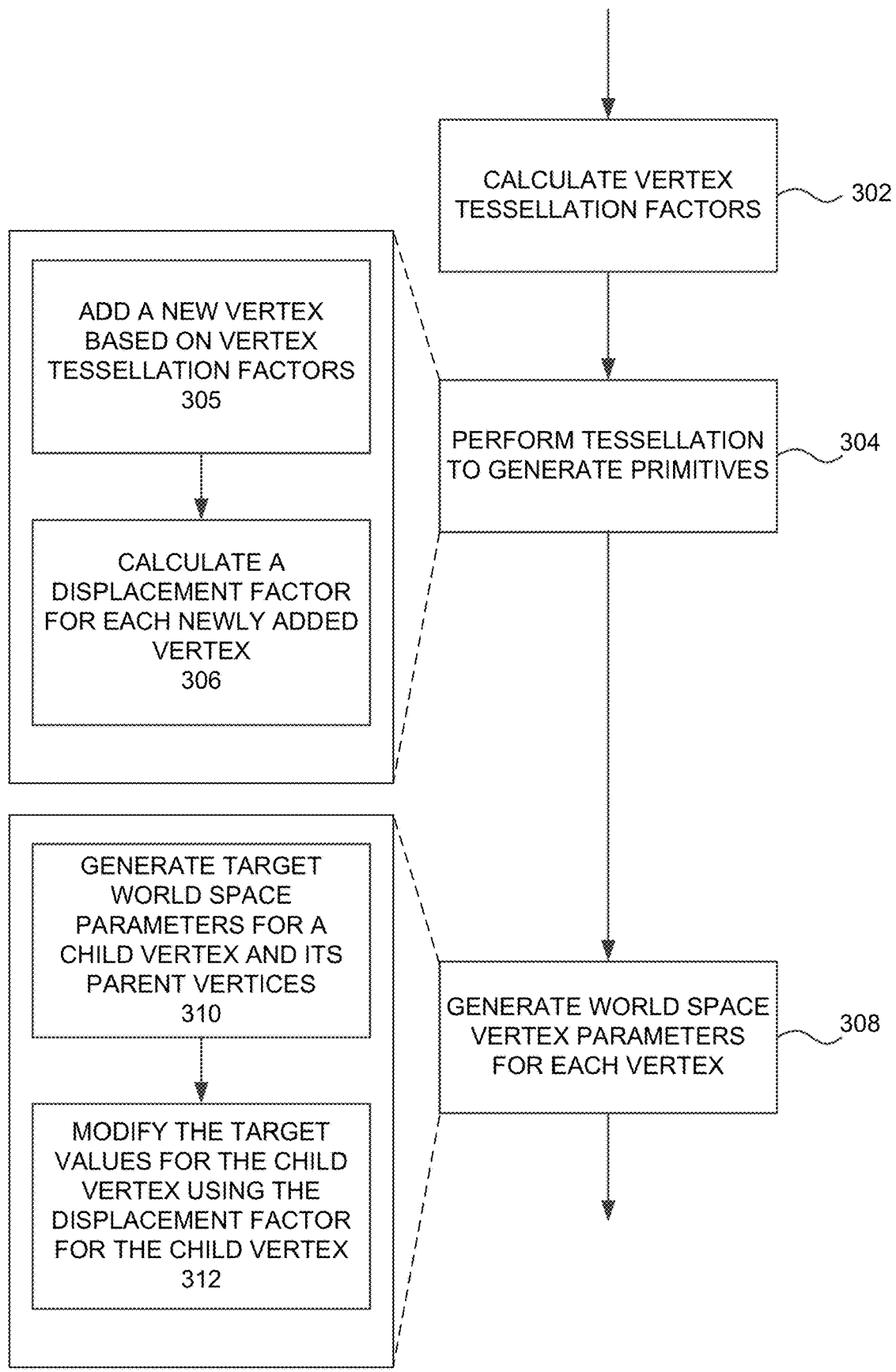
FIG. 3 is a flow diagram of an example tessellation method which uses displacement factors.

FIG. 3 is a flow diagram of an example tessellation method which uses displacement factors. The method shows three high level method blocks which may be implemented in a GPU pipeline. Examples of GPU pipelines are described in more detail below.

As shown in FIG. 3, a vertex tessellation factor is calculated for each corner vertex of one or more input patches (block 302) e.g. as a function of the vertex's position from the camera. Each of these input patches is then sub-divided into a plurality of primitives (e.g. triangles or lines) based on the vertex tessellation factors of the corner vertices of the patch (block 304), e.g. using one of the two example methods below or an alternative method. During sub-division one or more new vertices are added (block 305), with each new ('child') vertex being added at a position in domain space which sub-divides a line between two existing ('parent') vertices into two parts. As described above, the two parts may be equal (such that the child vertex bisects the line (or edge) between two parent vertices or there may be a difference in the length of the two parts such that the child vertex is not placed exactly between the two parent vertices. A displacement factor is calculated for each newly added vertex (block 306) and these displacement factors are subsequently used, along with the domain space coordinates of the vertices (in block 308) to generate one or more world space vertex parameters, such as position, normal and tangent, for each vertex in the primitives. These displacement factors are calculated (in block 306) using the vertex tessellation factors of the vertices (e.g. the parent vertices, although in other examples, the vertex TF of the child vertex may be used in addition or instead) at the time the new vertex is added and these vertex tessellation factors are not necessarily the same as the vertex tessellation factors for the vertices at the end of the tessellation process because, as is described in more detail below with reference to the two example tessellation methods, the vertex tessellation factors may be reduced during the tessellation process.

The generation of world space parameters (in block 308) for a vertex may, as is described in more detail below, comprise generating one or more target world space parameters for the child vertex and corresponding world space parameters for its two parent vertices (block 310) and then performing "blending" (block 312) in which, for each world space parameter of the child vertex, the target value of the particular parameter is modified based on the child vertex's displacement factor and on the generated value of that world space parameter for each of the two parent vertices. For example, if the parameter is the world space position, blending takes a target world space position for the child vertex and the world space position of each of its two parent vertices and generates a modified world space position for the child vertex based on the target world space position for the child vertex, the calculated world space positions for each of the two parent vertices (which as described below will be the 'target' world space positions for those vertices) and the displacement factor of the child vertex.

The calculation of the vertex tessellation factors (in block 302) may, for example, be implemented within a vertex shader that operates per-vertex (i.e. without knowledge of the mesh topology) whilst the sub-division of the input patches (in block 304) and the calculation of the displacement factors (in block 306) may be implemented within a hardware tessellation unit (or tessellator). Finally, the generation of the world space parameters for each vertex (in block 308) may be implemented within one or more shaders in the GPU (e.g. the blending may be performed within a blend shader, which may be implemented in hardware, and which may use target world space parameters generated by a domain shader which may be implemented in software).

Figure 2:
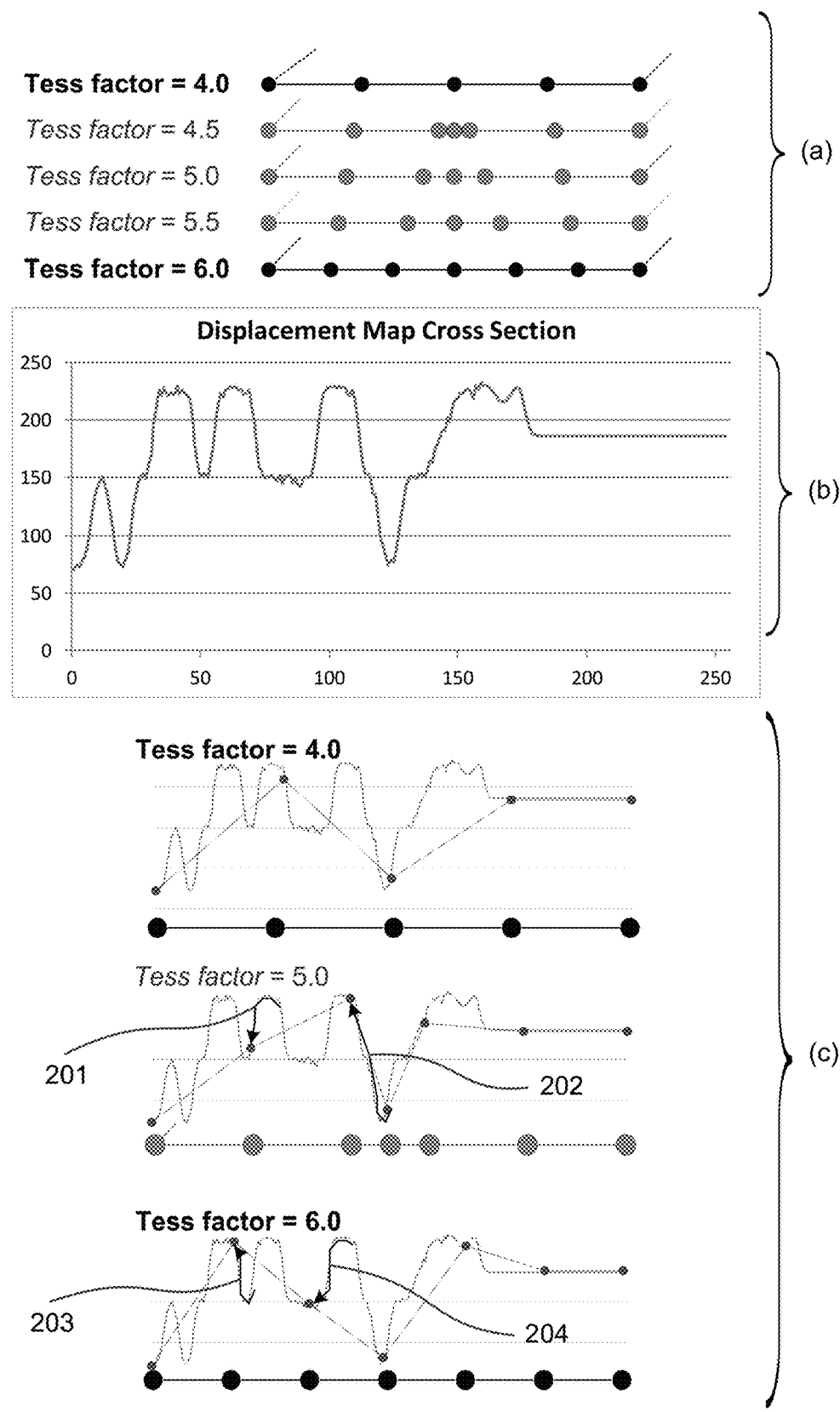
FIG. 2 shows the use of a displacement map with fractional partitioning.

The use of displacement factors, as described herein, addresses the problem referred to as 'popping' which arises in known tessellation methods as the level of detail changes (e.g. as an object comes closer to the camera and therefore needs to be rendered with a higher level of detail). Popping is often used to describe the visual artefact of a primitive changing orientation suddenly, however it can refer to any discontinuity in vertex members (e.g. a sudden change in normal on the point of a mesh by adding a new vertex would cause the lighting to change suddenly). This mainly arises when vertices are formed and displaced immediately by a heightmap. Some known fractional methods overcome this issue by introducing new vertices on top of old ones (which guarantees that all properties of the vertex are the same, e.g. position, normal, tangent, texture coordinate, etc.) and sliding them out into position as the level of detail increases (as described above with reference to FIG. 2). However use of such techniques introduces "swimming" artefacts in which the motion of a vertex results in the geometry appearing to shimmer (as shown in FIG. 2 and described above).

The displacement factors (as calculated in block 306) may be defined such that they have a value between zero and one (i.e. they have a value in [0,1]) and the value of the displacement factor for a vertex changes dependent upon the "age" of the vertex. In order to avoid popping, the displacement factor is zero for a vertex when it is first introduced (e.g. at a particular level of detail) and then the displacement factor increases (as the level of detail increases) and must be one before the vertex becomes a parent (as the level of detail increases further).

Whilst the examples described herein refer to displacement factors which range from zero to one, in other examples an alternative range may be used and the range may be more generally specified as [$df_{min}$, $df_{max}$] where $df_{min}$ is the minimum possible displacement factor (for newly added vertices) and $df_{max}$ is the maximum possible displacement factor (for original vertices and parent vertices).

The vertex tessellation factor of a vertex in a patch determines whether that patch requires further sub-division (in block 304, as described in more detail below with reference to the two example tessellation methods), and the vertex tessellation factor of the parent vertices can be used as an indicator of the child vertex's age and whether it could itself be a parent. If the vertex tessellation factors of the parent vertices (or at least one parent vertex, where the sub-division is contingent upon the vertex tessellation value of a single vertex) just meet the conditions for sub-division, then the child vertex is newly added and its displacement factor is zero. If the vertex tessellation factors of the parent vertices (or at least one parent vertex, where the sub-division is contingent upon the vertex tessellation value of a single vertex) significantly exceed the conditions for sub-division, such that more than one level of sub-division is required, then the child vertex may itself be a parent vertex and its displacement factor is one. Intermediate values of displacement factor (i.e. larger than zero but smaller than one) correspond to situations where the vertex tessellation factors of the parent vertices (or at least one parent vertex, where the sub-division is contingent upon the vertex tessellation value of a single vertex) are sufficiently large to exceed the criteria for sub-division (i.e. the child vertex is not newly added and hence the displacement factor is non-zero) but not so large that further sub-division (beyond the addition of the child vertex) may be triggered (i.e. the child vertex could not be a parent and hence the displacement factor is less than one).

Whilst the discussion herein refers to the changes to the displacement factor as the level of detail increases, the method also applies in situations where the level of detail is decreasing (e.g. where an object is moving away from the camera) and hence the displacement factor for a vertex starts at one where it could be a parent and then decreases, following the removal of its child vertex, to zero when the vertex is itself removed.

In the example tessellation methods described below, sub-division of a patch (or edge) occurs (in block 304) where one or both of the vertex tessellation factors of a pair of vertices exceeds a threshold, THRES and at each sub-division, the vertex tessellation factors are decreased by an amount, Δ. Consequently, if one or both of the parent vertices of a particular child vertex have vertex tessellation factors which exceed THRES+Δ, then multiple levels of sub-division may occur (and the child vertex may itself be a parent). Whereas, if one or both of the parent vertices of a particular child vertex have vertex tessellation factors which only just surpass THRES, then only one level of sub-division will occur and the child vertex will be newly created.

If V1 and V2 are two vertices which are the parents of vertex V3 (the child vertex) and the vertex tessellation factors (TF) of each vertex are denoted V1.TF, V2.TF and V3.TF respectively, then the displacement factor of the child vertex V3, V3.DF, may be given by:

$$V3.DF = G(MAX(V1.TF, V2.TF)) \quad (1)$$

where MAX( ) is the maximum of the numbers within the parentheses (e.g. the maximum of V1.TF and V2.TF in the expression above and this may alternatively be denoted $TF_{max}$) and:

$$G(TF) = (TF-THRES)/\Delta, \text{ if } TF \in (THRES, THRES+\Delta) \quad (2)$$

or $$G(TF) = 1, \text{ otherwise},$$

Where: TF∈(THRES, THRES+Δ) denotes that TF is in the open interval between THRES and THRES+Δ but is not equal to either THRES or THRES+Δ and $$TF = MAX(V1.TF, V2.TF) = TF_{max}.$$

The function MAX( ) is used because, as described above, tessellation occurs (in block 304) if either V1.TF or V2.TF is above THRES, so a vertex "disappears" when MAX(V1.TF, V2.TF) is at most THRES. $G(TF_{max})$ is 0 for $TF_{max}$ equal to THRES (i.e. the vertex has just appeared) and 1 for $TF_{max}$ above THRES+Δ. $TF_{max}$ must be greater than this bound for V3 to be a parent.

Where range of possible displacement factors given by [$df_{min}$, $df_{max}$] (rather than being [0,1]), equation (2) becomes:

$$G(TF) = (1-\alpha)*dfmin + \alpha*dfmax \quad (3)$$

where: $\alpha = (TF-THRES)/\Delta$.

Where the example tessellation method described below is used in block 304, THRES may be 0.0 and Δ=INTERVAL for a quad or triangle patch and Δ=2×INTERVAL for an isoline patch, where INTERVAL may be 0.5 (assuming that the tessellation factors are specified to the log base 2).

There will be some vertices for which the displacement factor is fixed at one as those vertices will always be present (and hence must always be fully displaced). These vertices include any vertex of a target input patch and in various examples (e.g. where the first example tessellation method is used) the middle vertex of a quad domain.

Depending upon the particular tessellation method used, there may be vertices which have more than two parent vertices. For example, the middle vertex of an input triangle domain has three parents (denoted top, left and right) and in such an example, the displacement factor for that middle vertex is given by:

$$G(MAX(TOP.TF, LEFT.TF, RIGHT.TF)) \quad (4)$$

where TOP.TF is the vertex tessellation factor of the top vertex, LEFT.TF is the vertex tessellation factor of the left vertex and RIGHT.TF is the vertex tessellation factor of the right vertex.

Figure 4A:
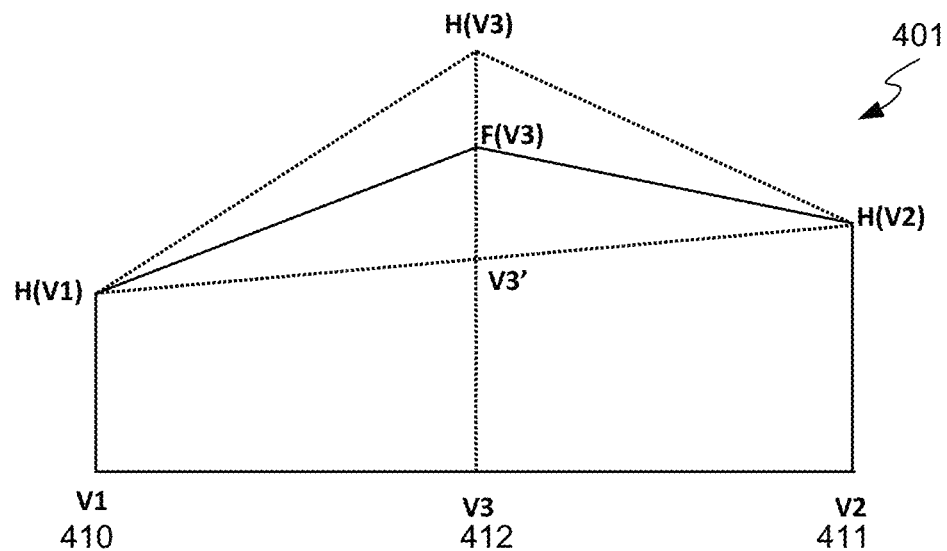
FIGS. 4A and 4B are schematic diagrams of the blending process which is used to interpolate between parent vertices and uses displacement factors.

The blending of the world space vertex parameters (in block 308 and in particular in block 312) can be described with reference to FIGS. 4A and 4B. FIG. 4A illustrates blending 401 for one particular vertex parameter—the world space position—and FIG. 4B extends the method to relate to all vertex parameters (which may also be referred to as vertex member values) 402.

As described above, each new vertex is given a displacement factor, df (as calculated in block 306) which describes how far the vertex should be displaced. A displacement factor of 0 should indicate that a vertex has just been introduced and hence should lie on the line passing through its "parent" vertices in world space (the 'starting position'). A displacement factor of 1 should indicate that a vertex may be a parent and should be set to its correct position in world space, possibly given by a heightmap (e.g. by sampling a grayscale image) or determined from an alternative source of equivalent information such as a Bezier surface.

FIG. 4A shows the new vertex V3 and its two parent vertices V1 and V2. The positions of the vertices are shown in domain space (as indicated by arrows 410-412) where V3=(V1+V2)/2. H( ) is the height function which determines the full (or target) displacement of any vertex and V3' is the starting position of the new vertex which is at the mid-point (in world space) between the two parent vertices, i.e. V3'=(H(V1)+H(V2))/2.

The displaced (or modified) position (in world space) of V3 is a function of its displacement factor, df, denoted F(V3, df) and is determined by interpolating between V3' and H(V3) as follows:

$$F(V3,df)=(1-df)*V3'+df*H(V3) \quad (5)$$

In the event that a vertex has three parent vertices (rather than two as in the example above), then V3' is given by (H(V0)+H(V1)+H(V2))/3 where the parent vertices are V0, V1 and V2. This may be extrapolated further in the event that a vertex has more than three parent vertices.

Figure 4B:
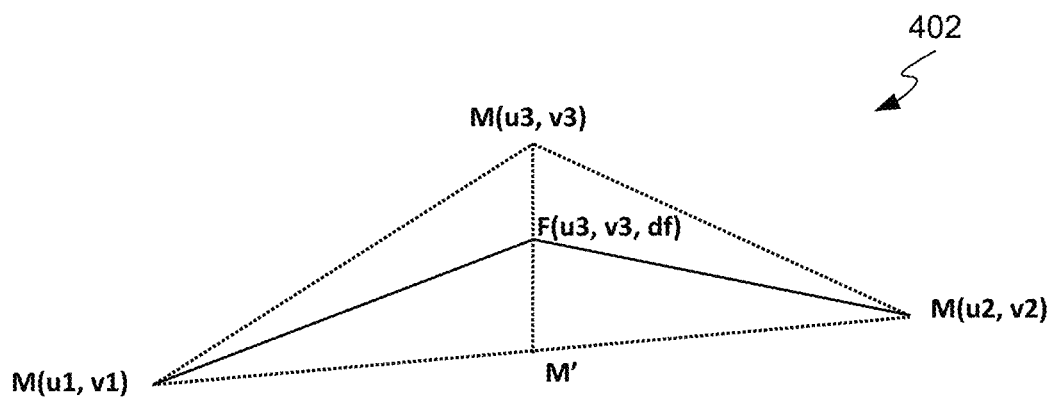

Referring now to FIG. 4B, as this diagram relates to more than just position, a displacement factor of one indicates that a vertex should be set to its final or target state, whereas for displacement factors of less than one, the value of each vertex member value (e.g. position, normal, tangent) is modified from the target value based on the displacement value.

Diagram 402 in FIG. 4B shows (u1, v1) and (u2, v2) as the domain space coordinates of the two parent vertices and (u3, v3) as the domain space coordinate of the new (child) vertex, where u3=(u1+u2)/2 and v3=(v1+v2)/2. M( ) is the function which calculates the target vertex member value, given the domain space coordinate (u, v) and M' is the starting state of the new (child) vertex. The value of M' may be determined as follows:

$$M'=RAST\_INTERP(M(u1,v1),M(u2,v2),A) \quad (6)$$

where RAST_INTERP is the interpolation function used by the rasteriser (in the GPU pipeline) across the triangle domain and is usually linear interpolation and A is a constant. In examples where the child vertex bisects an edge, A=0.5 and where the child vertex does not bisect the edge, the constant A may have a different value. Using this choice of M', the state of any new vertex has the same member values as the pixel (which is halfway between its parent vertices) would have had after rasterization and hence ensures no popping of geometry or lighting when a new vertex is introduced.

To determine the current state of the new vertex, F(u3, v3, df), the method interpolates between M' and M(u3, v3) by df, linearly:

$$F(u3,v3,df)=(1-df)*M'+df*M(u3,v3) \quad (7)$$

In the event that a vertex has three parent vertices (e.g. the middle vertex of the triangle domain in the first example tessellation method described below), M' is instead given by:

$$M'=RAST\_INTERP(M(1,0,0),M(0,1,0),M(0,0,1),\\C,D,E) \quad (8)$$

in barycentric coordinates, where C, D and E are constants. In examples where the child vertex is placed at the barycentre, C=1/3, D=1/3, E=1/3 and where the child vertex is not placed exactly at the barycentre, the constants C, D, E may have different values.

Figure 5:
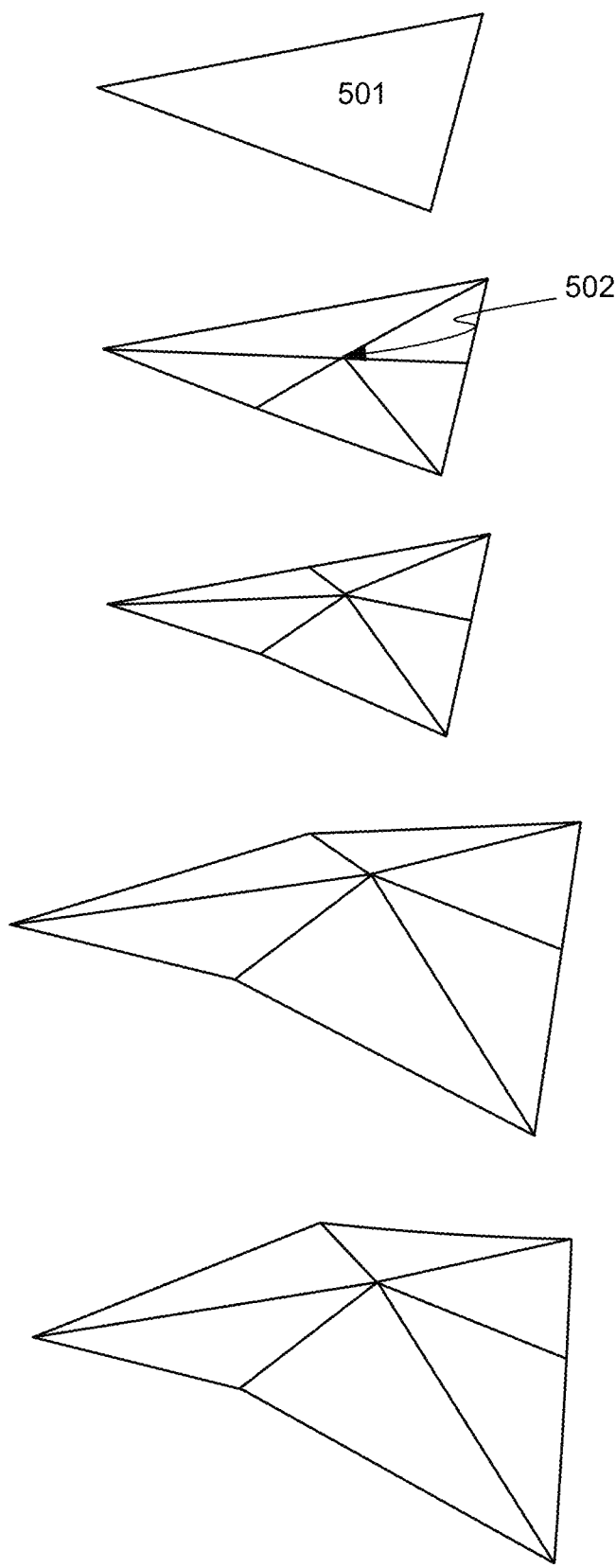
FIG. 5 shows how the geometry changes as tessellation factors increase using displacement factors.

The images in FIG. 5 demonstrate how the geometry changes as tessellation factors increase using the displacement factors (as described above). The domain begins as an untessellated triangle 501. Then as soon as sub-division is required a middle vertex 502 is introduced, however all vertices still lie in the plane of the triangle. As the tessellation factors increase the vertices are displaced as shown by the subsequent diagrams until the vertex reaches its correct position.

As described above, the displacement factors may be used with any compatible tessellation method (i.e. one which uses vertex tessellation factors and comprises adding a plurality of new vertices where each new vertex is added at a point in domain space which sub-divides an edge between two parent vertices). An example tessellation method is described below.

When selecting a tessellation method considerations include not only avoiding visual artefacts and the numbers of triangles generated for given combinations of edge tessellation settings (since the rendering cost of the tessellated model is partially dependent on the number of triangles), but also the aspect ratio of those triangles. Typically graphics systems (either software or hardware) will render an 'equilateral' triangle of a given screen area (i.e. screen pixels), which implies a minimum perimeter to area ratio, more quickly than a (long thin) triangle which has the same area but a higher perimeter to area ratio. Furthermore, when values, such as the results of shading, are computed at vertices and then interpolated across triangles, having more equilaterally-shaped triangles should result in fewer artefacts.

A further consideration is the complexity of the algorithm used to generate the pattern of triangles. If the algorithm can be kept simple and or regular (e.g. without having many 'special cases' that need to be handled differently), this can reduce hardware or software implementation costs.

A final desirable consideration is rotational/reflective symmetry in the tessellation pattern. It would be preferable that, for example, a quad patch defined with vertices, given in, say, clockwise order, ABCD and with appropriate tessellation factors, produce the same final triangle mesh as the 'equivalent' quad with vertices listed as BCDA. Some existing tessellation schemes do not guarantee this property (e.g. see the middle square in the 'odd' tessellation methods in examples (e) and (f) of FIG. 1).

An example tessellation method can be described with reference to FIGS. 6-16.

Figure 6:
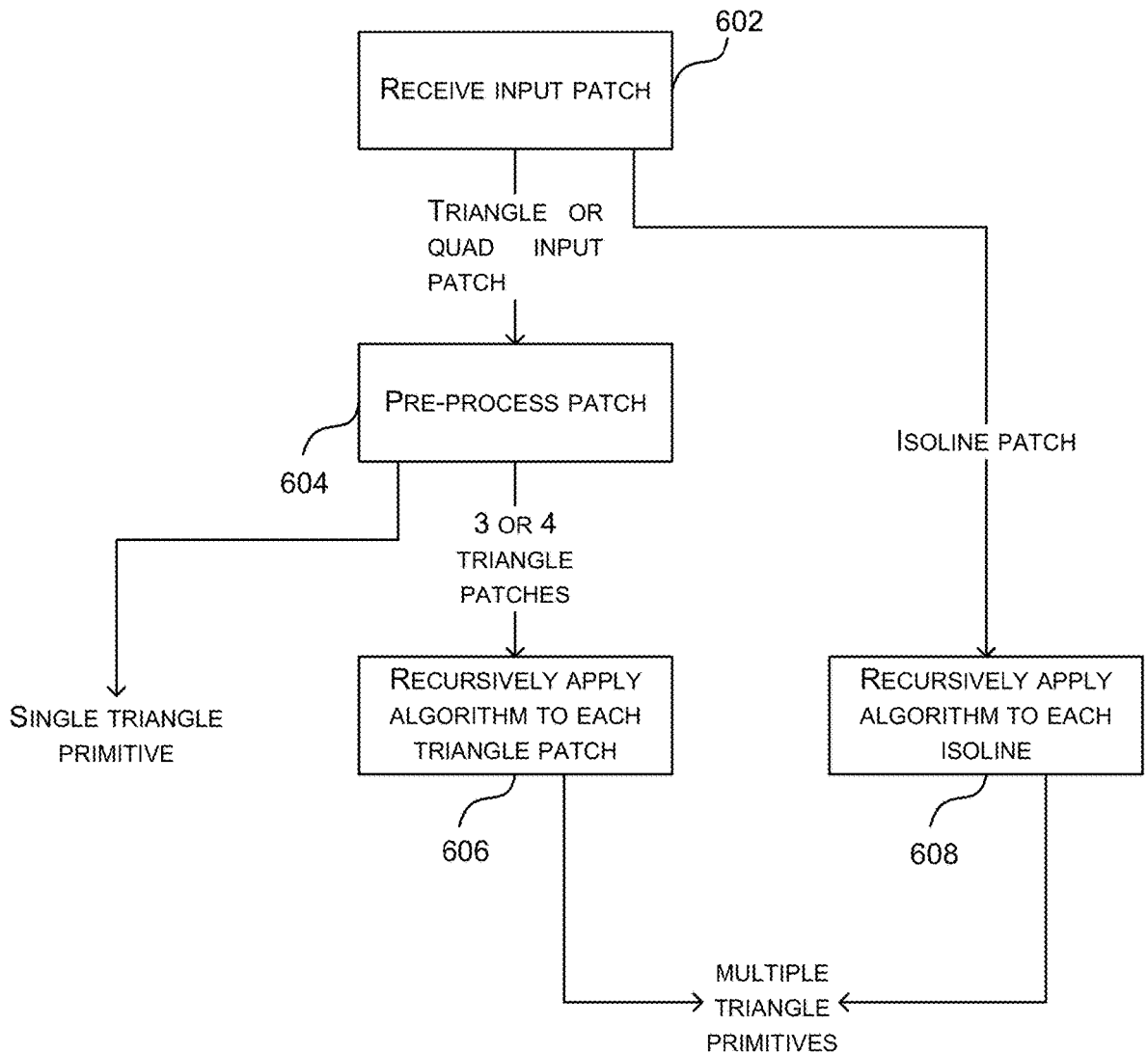
FIG. 6 is a flow diagram of the improved tessellation method.
Figure 7:
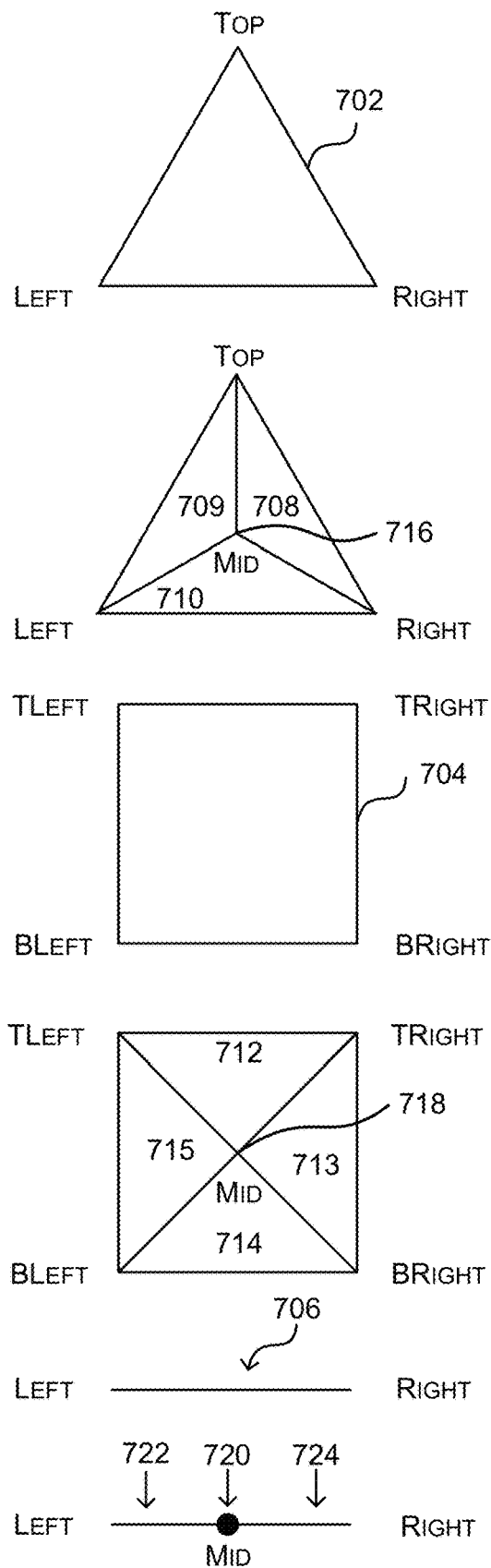
FIG. 7 shows various input patches and illustrating a pre-processing stage of the method of FIG. 6.

FIG. 6 is a flow diagram of the improved tessellation method. The method starts when a patch (referred to as an input patch) is fed into the tessellator. The tessellator (which may be hardware tessellator) receives the input patch (block 602) where this input patch may be a triangle patch 702, a quad patch 704 or an isoline patch 706, as shown in FIG. 7. Whilst the quad patch 706 is a square in domain space (with vertices at (0,0), (1,0), (0,1) and (1,1)), the shape it represents in world space (i.e. within the 3D or 2D environment) may be a different shape. As described above, tessellation is performed in domain space and not in world space.

If the input patch is a triangle patch or a quad patch, the patch undergoes a 'pre-processing' stage (block 604) before the tessellation algorithm is recursively applied to triangle patches within the input patch (block 606). The pre-processing stage is used to ensure tessellation is independent of orientation and as a result is not required for an isoline patch 706 (as the algorithm works symmetrically and so there is no orientation dependence of any resulting tessellation).

If the input patch is a triangle patch 702, the pre-processing stage (block 604) outputs either one triangle patch 702 (which is the same as the input triangle patch and where no tessellation is required) or three triangle patches 708-710. If the input patch is a quad patch 704, the pre-processing stage (block 604) outputs four triangle patches 712-715. If the input patch is an isoline patch, no pre-processing is required (for the reasons set out above) and the tessellation algorithm is recursively applied to the input isoline patch (block 608).

FIGS. 8-11 show the stages of the improved tessellation method in more detail. The method as described uses the following notation:

THRES—a threshold value for tessellation which may, for example, be set to 0.0 or 0.5 where the vertex TF is the value of the amount of tessellation to the log base 2.

VERTEX.TF—the tessellation factor of a vertex which can be any real number (although in various examples, any negative values may be clamped to zero such that the tessellation factor is a non-negative real number). In various examples the vertex TF is at least 0.0 (no tessellation) and at most 6.0 (max tessellation) where the value of the amount of tessellation to the log base 2, e.g. a tessellation factor of 5.0 corresponds to 32 sub-divisions. In other examples, however, the maximum vertex TF may exceed 6.0 (or 64, where log base 2 is not used).

INTERVAL—a non-zero amount by which VERTEX.TF is decreased by after each iteration which may, for example, be set to 0.5 where the vertex TF is the value of the amount of tessellation to the log base 2.

MEAN( )—a symmetric function giving the "mean" of two, three or four vertex tessellation factors. This may be the arithmetic mean or an alternative function and one such alternative is described in more detail below.

For the purpose of the following description, the vertex TF is the amount of tessellation to the log base 2; however, it will be appreciated that it may alternatively written as its actual, full value and in which case the calculations of vertex TFs set out below and the values of the parameters THRES and INTERVAL will be modified accordingly. However, as the hardware implementation is much faster where log base 2 is used, in examples where the input to the tessellator comprises actual vertex TFs (rather than using log base 2), the input vertex TFs may be converted to log base 2 prior to implementing the improved tessellation method described herein.

Figure 8:
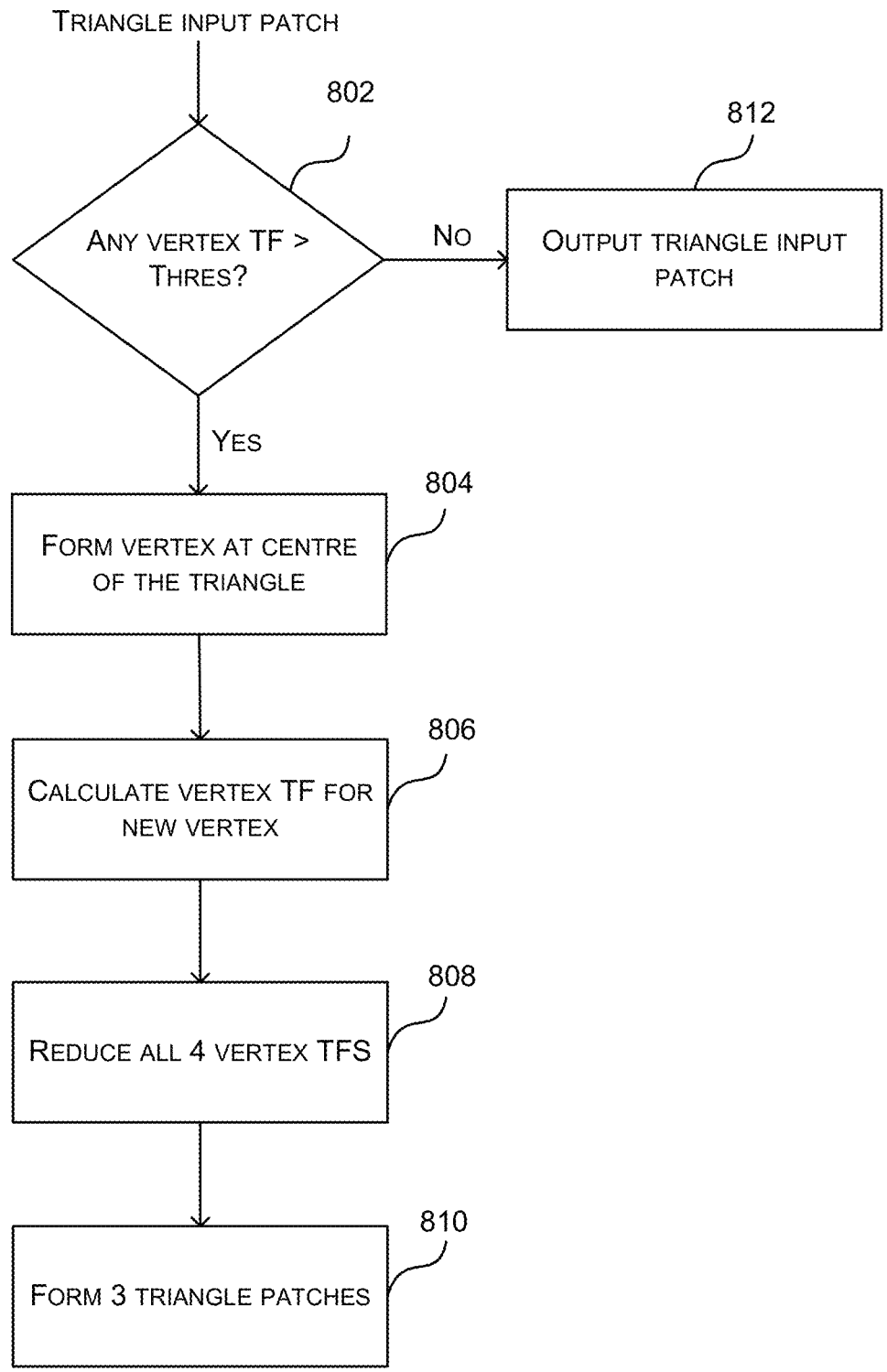
FIG. 8 is a flow diagram of the pre-processing stage of the method of FIG. 6 for a triangle input patch.

FIG. 8 is a flow diagram of the pre-processing stage 604 for a triangle input patch 702 and as shown in FIG. 7, the vertices of the triangle patch may be labeled 'TOP', 'RIGHT' and 'LEFT'. The selection of which vertex is 'TOP' is arbitrary and this pre-processing stage ensures that the algorithm is rotationally and reflectively symmetric (i.e. such that the same tessellation results are achieved irrespective of the order in which vertices are considered in this pre-processing stage).

As shown in FIG. 8, when a triangle patch (TOP, RIGHT, LEFT) 702 is fed into the tessellator and any vertex tessellation factor is greater than the threshold, THRES ('Yes' in block 802) tessellation occurs. A new vertex 716 which is denoted 'MID' is formed at the center (e.g. at the barycenter) of the triangle (block 804) and the vertex TF for the new MID vertex is calculated (in block 806) to be:

MID.TF=MEAN(TOP.TF,LEFT.TF,RIGHT.TF)  (9)

where MID.TF is the vertex TF of the MID vertex, TOP.TF is the vertex TF of the TOP vertex, LEFT. TF is the vertex TF of the LEFT vertex and RIGHT.TF is the vertex TF of the RIGHT vertex. All four tessellation factors (i.e. TOP.TF, LEFT.TF, RIGHT.TF and MID.TF) are then reduced by the parameter INTERVAL (i.e. by subtracting INTERVAL where log base 2 notation is used) as some tessellation has occurred (block 808).

Three triangle patches (MID, RIGHT, LEFT) 710, (MID, LEFT, TOP) 709 and (MID, TOP, RIGHT) 708 are then formed (block 810) and it is these triangle patches which are tessellated using the tessellation algorithm (in block 606) as described below.

If none of the vertex tessellation factors are greater than the threshold, THRES ('No' in block 802) no tessellation occurs. In this situation, the patch simply passes through the tessellator as one primitive (block 812) in order that the method does not over tessellate.

Figure 9:
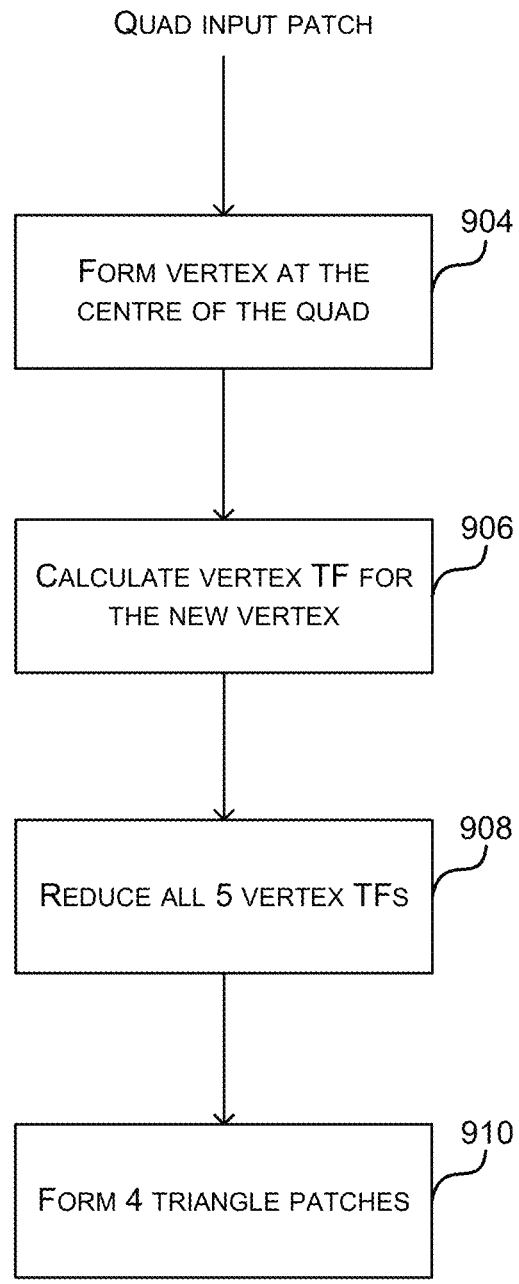
FIG. 9 is a flow diagram of the pre-processing stage of the method of FIG. 6 for a quad input patch.

FIG. 9 is a flow diagram of the pre-processing stage 604 for a quad input patch 704 and as shown in FIG. 7, the vertices of the quad patch may be labeled 'TLEFT' (or top left), 'TRIGHT' (or top right), 'BRIGHT' (or bottom right) and 'BLEFT' (or bottom left). The selection of which vertices are 'top' and which are 'bottom' is arbitrary and this pre-processing stage ensures that the algorithm is rotationally and reflectively symmetric (i.e. such that the same tessellation results are achieved irrespective of the order in which vertices are considered in this pre-processing stage).

As shown in FIG. 9, when a quad patch (TLEFT, TRIGHT, BLEFT, BRIGHT) 704 is fed into the tessellator, a new vertex 718 which is denoted 'MID' is formed at the center of the quad (block 904), i.e. at domain space coordinates (0.5,0.5), and the vertex TF for the new MID vertex is calculated (in block 906) to be:

MID.TF=MEAN(TLEFT.TF,TRIGHT.TF,BLEFT.TF, BRIGHT.TF)  (10)

where MID.TF is the vertex TF of the MID vertex, TLEFT.TF is the vertex TF of the TLEFT vertex etc. All five tessellation factors (i.e. TLEFT.TF, TRIGHT.TF, BRIGHT.TF, BLEFT.TF and MID.TF) are then reduced by the parameter INTERVAL (i.e. by subtracting INTERVAL where log base 2 notation is used) as some tessellation has occurred (block 908).

Four triangle patches (MID, TLEFT, TRIGHT) 712, (MID, TRIGHT, BRIGHT) 713, (MID, BRIGHT, BLEFT) 714 and (MID, BLEFT, TLEFT) 715 are then formed (block 910) and it is these triangle patches which are tessellated using the tessellation algorithm (in block 606) as described below.

Figure 10:
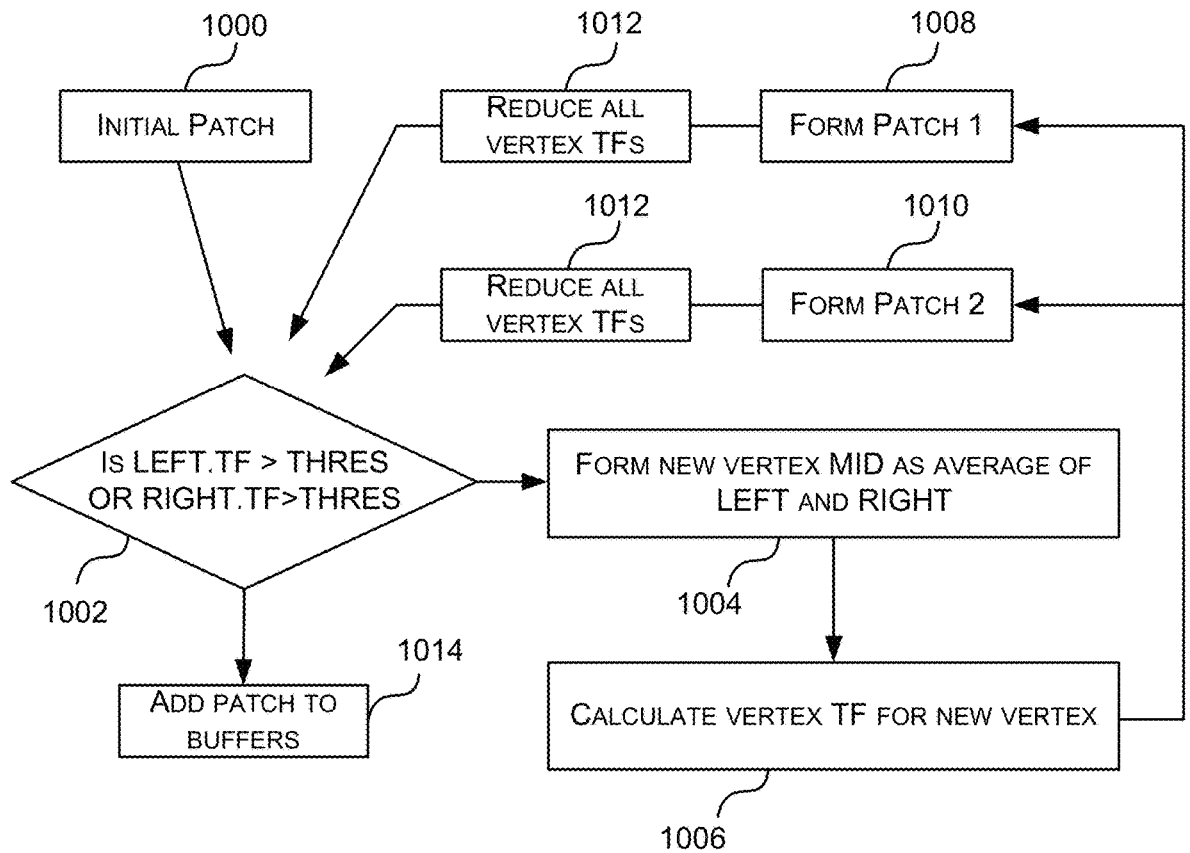
FIG. 10 is a flow diagram of the recursive application of an algorithm to each of the three or four triangle patches output by the pre-processing stage or to an input isoline patch.
Figure 11:
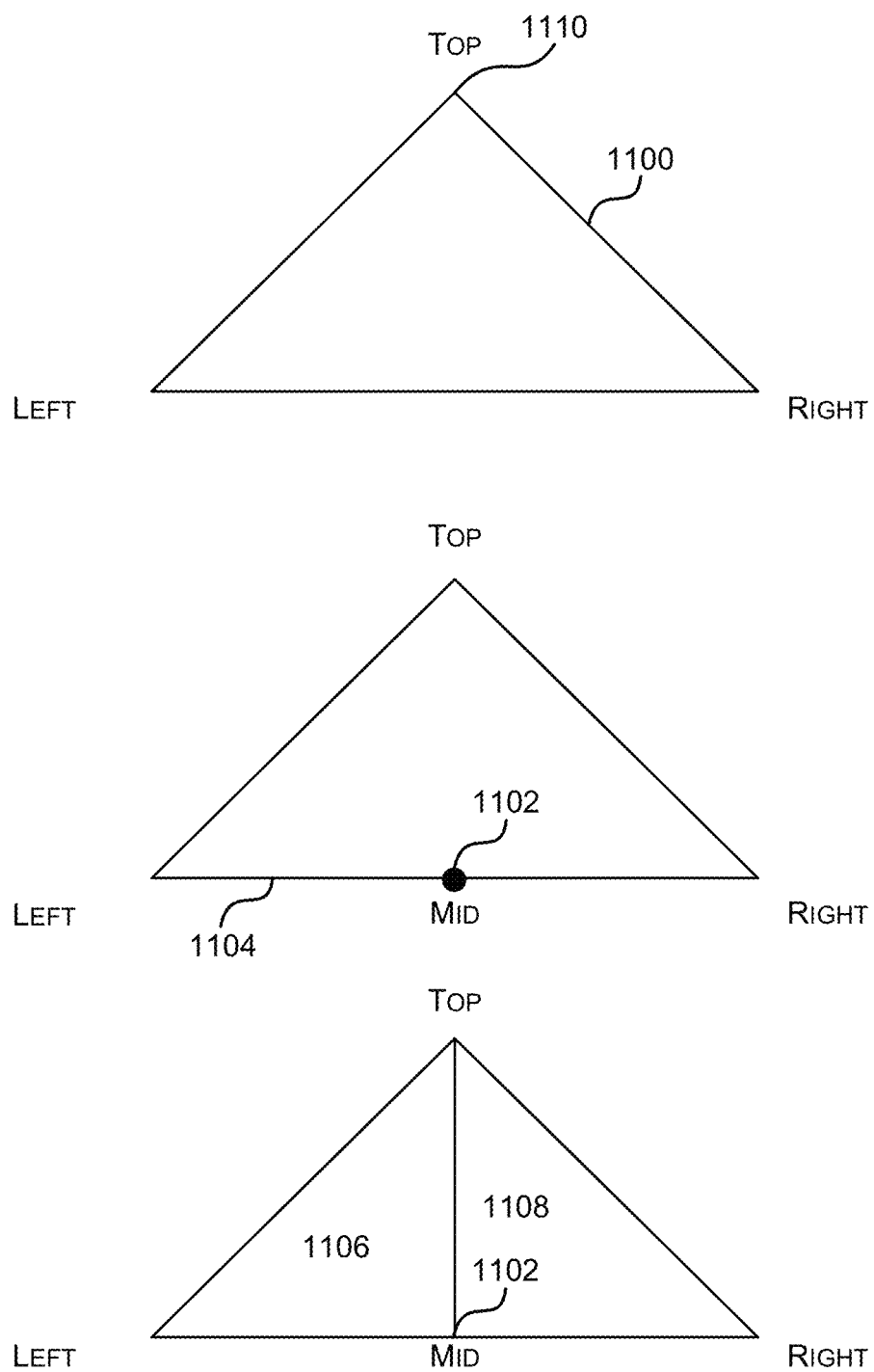
FIG. 11 shows triangles illustrating the method of FIG. 10.
Figure 12:
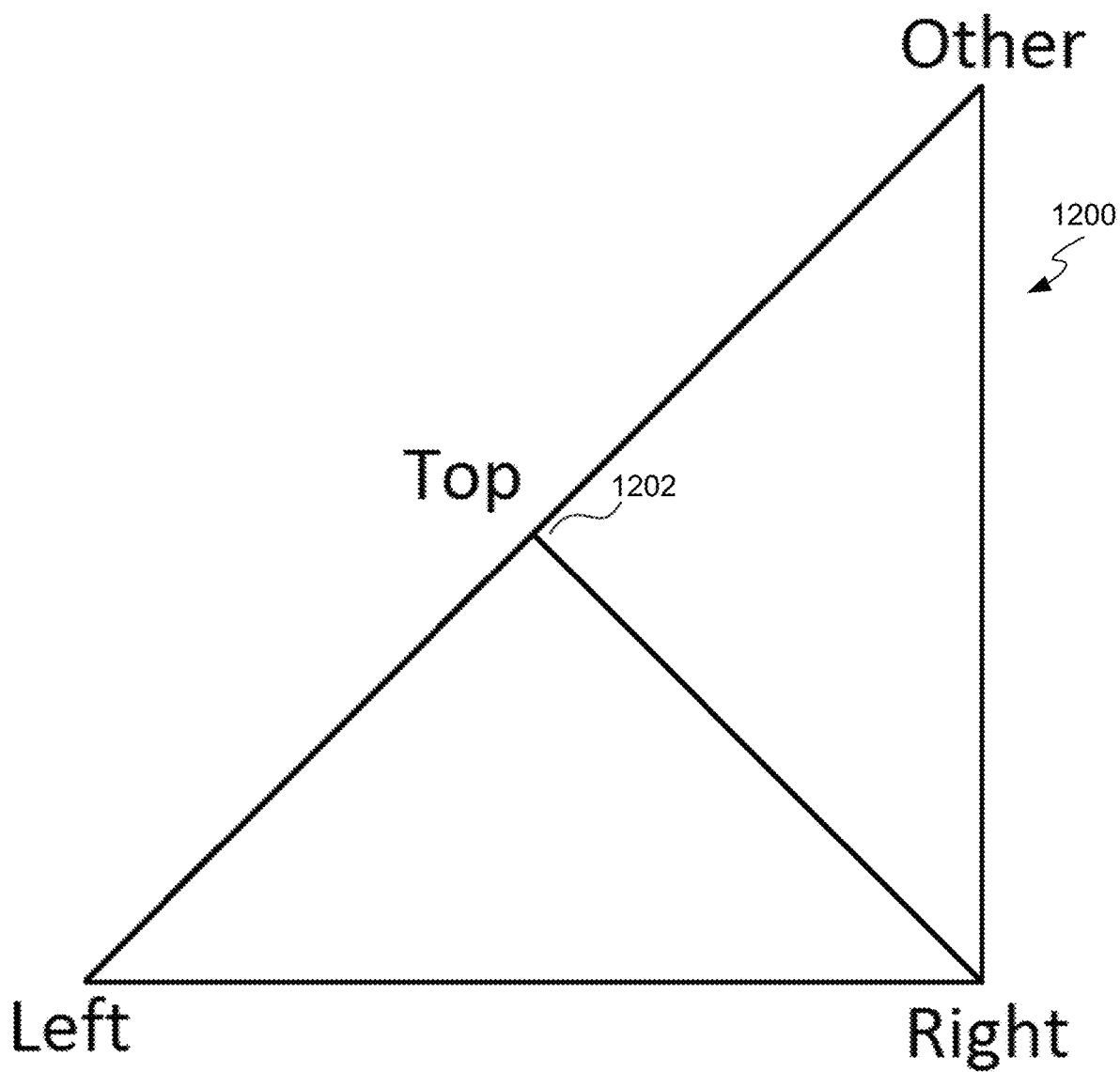
FIG. 12 shows triangles illustrating the improved tessellation method described herein.

FIG. 10 is a flow diagram of the recursive application of an algorithm to each of the three or four triangle patches output by the pre-processing stage and this can be described with reference to the triangles shown in FIG. 11. As shown in FIG. 11, a triangle patch is an ordered set of three vertices (TOP, RIGHT, LEFT) in a clockwise direction. Note that the first vertex is always the "TOP" vertex and for an initial triangle patch (as output by the pre-processing stage) this 'TOP' vertex corresponds to the 'MID' vertex 708, 718 which is added during the pre-processing (blocks 804, 904).

As shown in FIG. 10, given a triangle patch 1100 (which in the first iteration is initial patch 1000) tessellation occurs if and only if LEFT.TF>THRES or RIGHT.TF>THRES  (11)

where LEFT. TF is the vertex TF of the LEFT vertex and RIGHT.TF is the vertex TF of the RIGHT vertex ('Yes' in block 1002).

If LEFT.TF>THRES or RIGHT.TF>THRES ('Yes' in block 1002), a new vertex MID 1102 is formed (in block 1004) which divides the edge LEFT→RIGHT in domain space (indicated by arrow 1104) into two parts. The vertex tessellation factor for the new MID vertex is then calculated (in block 1006) to be:

$$MID.TF=MEAN(LEFT.TF,RIGHT.TF) \quad (12)$$

where MID.TF is the vertex TF of the MID vertex, LEFT. TF is the vertex TF of the LEFT vertex and RIGHT.TF is the vertex TF of the RIGHT vertex. For convention the vertices LEFT and RIGHT which define the edge which MID sub-divides are denoted the "parents" of MID.

In many examples, the new vertex MID is added as the bisector as the edge LEFT→RIGHT in domain space. However, in other examples, the new vertex MID may be added at a position which is on the edge LEFT→RIGHT in domain space but which does not exactly bisect it. In various examples, the position of MID along the edge may be weighted, e.g. using the vertex TFs of the parent vertices.

Two sub triangle patches (MID, LEFT, TOP) 1106 and (MID, TOP, RIGHT) 1108 are formed (blocks 1008 and 1010) and all tessellation factors in each triangle patch 1106, 1108 are reduced by the parameter INTERVAL (block 1012, i.e. by subtracting INTERVAL where log base 2 notation is used). The method then recurses on each of these patches. When performing the method on a triangle patch created in block 1008 or block 1010 the 'TOP' vertex corresponds to the 'MID' vertex 1102 which was added (in block 1004) to create the patch and this will be different to the 'TOP' vertex of the parent patch (e.g. patch 1100 can be considered the parent of patches 1106 and 1108 and the 'TOP' vertex 1110 of 1100 is not the same as the 'TOP' vertex 1102 of each of patches 1106 and 1108).

If at any stage no tessellation occurs ('No' in block 1002) a primitive (which is the patch) is added to a buffer (block 1014), e.g. to an index buffer.

As described above, the method of FIG. 10 is applied to each of the three or four triangle patches which are generated by the pre-processing stage (block 604) and recursively to any patches created by the sub-division of those initial patches.

As the vertex tessellation factors are finite and INTERVAL is constant and non-zero eventually all the vertex tessellation factors (in all the triangle patches) will be at most THRES and the process will terminate.

As can be seen in FIG. 11, the newly added MID vertex is a vertex in both of the two patches which are formed (in blocks 1008 and 1010) and in both patches this vertex is considered to be the 'TOP' vertex. The current value of the vertex tessellation factor of the newly added MID vertex must be used when recursing into both of the sub-patches. In example implementations that can be ensured either by duplicating the vertex TF for each sub-patch or having a final step to the algorithm in which, for any patch and after recursion on its two sub-patches, each vertex TF is increased by the parameter INTERVAL.

The same algorithm that is used in FIG. 10 may also be applied to an isoline patch (in block 608) although, as described above, no pre-processing is required and in the case of an isoline patch, the algorithm is applied to lines (i.e. isolines and sub-isolines) rather than triangles as can be described with reference to FIG. 7.

If an isoline patch (LEFT, RIGHT) 706 is fed into the tessellator (as initial patch 1000) then the line is sub-divided if either LEFT.TF or RIGHT.TF is above THRES ('Yes' in block 1002). If either LEFT.TF or RIGHT.TF is above THRES ('Yes' in block 1002), a new MID vertex 720 is added which sub-divides (e.g. bisects), in domain space, the LEFT→RIGHT isoline 706 (block 1004). A vertex TF for the newly added MID vertex is calculated (in block 1006) to be:

$$MID.TF=MEAN(LEFT.TF,RIGHT.TF) \quad (13)$$

where MID.TF is the vertex TF of the MID vertex, LEFT. TF is the vertex TF of the LEFT vertex and RIGHT.TF is the vertex TF of the RIGHT vertex.

The addition of the MID vertex 720 divides the original isoline 706 into two sub-isolines 722, 724 (formed in blocks 1008 and 1010) and each vertex TF is reduced by 2*INTERVAL (in block 1012, e.g. by subtracting 2*INTERVAL where log base 2 notation is used)—note that this reduces the vertex TFs faster than for a triangle patch to produce the correct amount of sub-division. The method then recurses on each of these sub-isolines and terminates when all the vertex tessellation factors will be at most THRES.

The improved tessellation method described above uses a MEAN(function. Whilst this could, in some examples, be the arithmetic mean of the vertex tessellation factors, which would result in a smooth introduction of geometry when moving from one vertex to another, such a function would often result in T-junctions appearing and hence cracking for certain values of vertex TF (e.g. where the difference in vertex TFs across a patch is quite extreme). Consequently, in many examples, an alternative function is used for MEAN ( ) as follows:

$$MEAN(TF1,TF2,\ldots)=MIN(AVG(TF1, TF2,\ldots),MIN(TF1,TF2,\ldots)+INTERVAL) \quad (14)$$

where AVG( ) is the arithmetic mean of a list of values within the parentheses (e.g. vertex TF1, vertex TF2, . . . in the example above) and MIN( ) is the minimum of a list of values within the parentheses (e.g. vertex TF1, vertex TF2, . . . in the example above).

The MEAN( ) function given above is the closest function to the arithmetic mean which ensures no cracking and this can be demonstrated as set out below.

As described above T-junctions within a tessellation can result in cracking and hence it may be desired to ensure that no T-junctions can arise, either in the interior of a domain or along an edge shared by two domains.

The improved tessellation method described herein ensures this by guaranteeing that the sub-division of any edge is solely defined by the tessellation factors of the edge end vertices (and by no others). Hence if an edge is shared by two domains (i.e. two adjacent domains) then the domains share its two end vertices (and their vertex tessellation factors) and the same sub-divisions will be produced.

As described above, sub-division occurs only when the end vertex tessellation factors exceed the threshold so no extra sub-division can occur. The only possible problem is if sub-division does not occur when it should due to a previous level of sub-division not happening beforehand and hence, to avoid this problem, it is necessary that the following condition, which refers to a triangle patch 1100 with vertices labeled as shown in FIG. 11, is met:

Tessellation needed on the TOP→LEFT edge implies Tessellation happened on the LEFT→RIGHT edge i.e. (TOP.TF>THRES or LEFT.TF>THRES)=>
(LEFT.TF+INTERVAL>THRES or RIGHT.TF+
INTERVAL>THRES)

This condition, without loss of generality, considers the left hand edge only due to symmetry.

It can then be demonstrated that the MEAN( ) function specified above satisfies this condition:

Case 1: If LEFT.TF>THRES then LEFT>TF+INTERVAL>THRES

Case 2: TOP.TF>THRES has the following two sub-cases:

Case 2.1 (TOP is middle vertex of patch as shown in patch 1100 in FIG. 11 and this corresponds to vertex 716 or 718 in FIG. 7), i.e. TOP.TF=MEAN(LEFT.TF, RIGHT.TF, . . . )) hence THRES<TOP.TF=MIN(AVG(LEFT.TF,RIGHT. TF, . . . ),MIN(LEFT.TF,RIGHT.TF, . . . )+ INTERVAL)<=MIN(LEFT.TF,RIGHT. TF, . . . )+INTERVAL<=LEFT.TF+INTERVAL So LEFT.TF+INTERVAL>THRES Case 2.2 (TOP is made by sub-division with LEFT as an end vertex, as shown in patch 1200 in FIG. 12 where TOP 1202 is made by the sub-division of the edge LEFT→OTHER, i.e. TOP.TF=MEAN(LEFT.TF, . . . )) so THRES<TOP.TF=MIN(AVG(LEFT.TF, . . . ),MIN (LEFT.TF, . . . )+INTERVAL)<=MIN(LEFT. TF, . . . )+INTERVAL<=LEFT.TF+INTERVAL So LEFT.TF+INTERVAL>THRES In Case 2.2, the same logic can be applied to TOP.TF=MEAN(RIGHT.TF, . . . ) (which corresponds to a reflection of that shown in FIG. 12) to derive that RIGHT.TF+INTERVAL>THRES as desired. Note also that the choice of function is optimal, in that any function that exceeds the minimum plus INTERVAL would not always satisfy these inequalities. Hence the MEAN(function cannot be any closer to the arithmetic mean.

Figure 13:
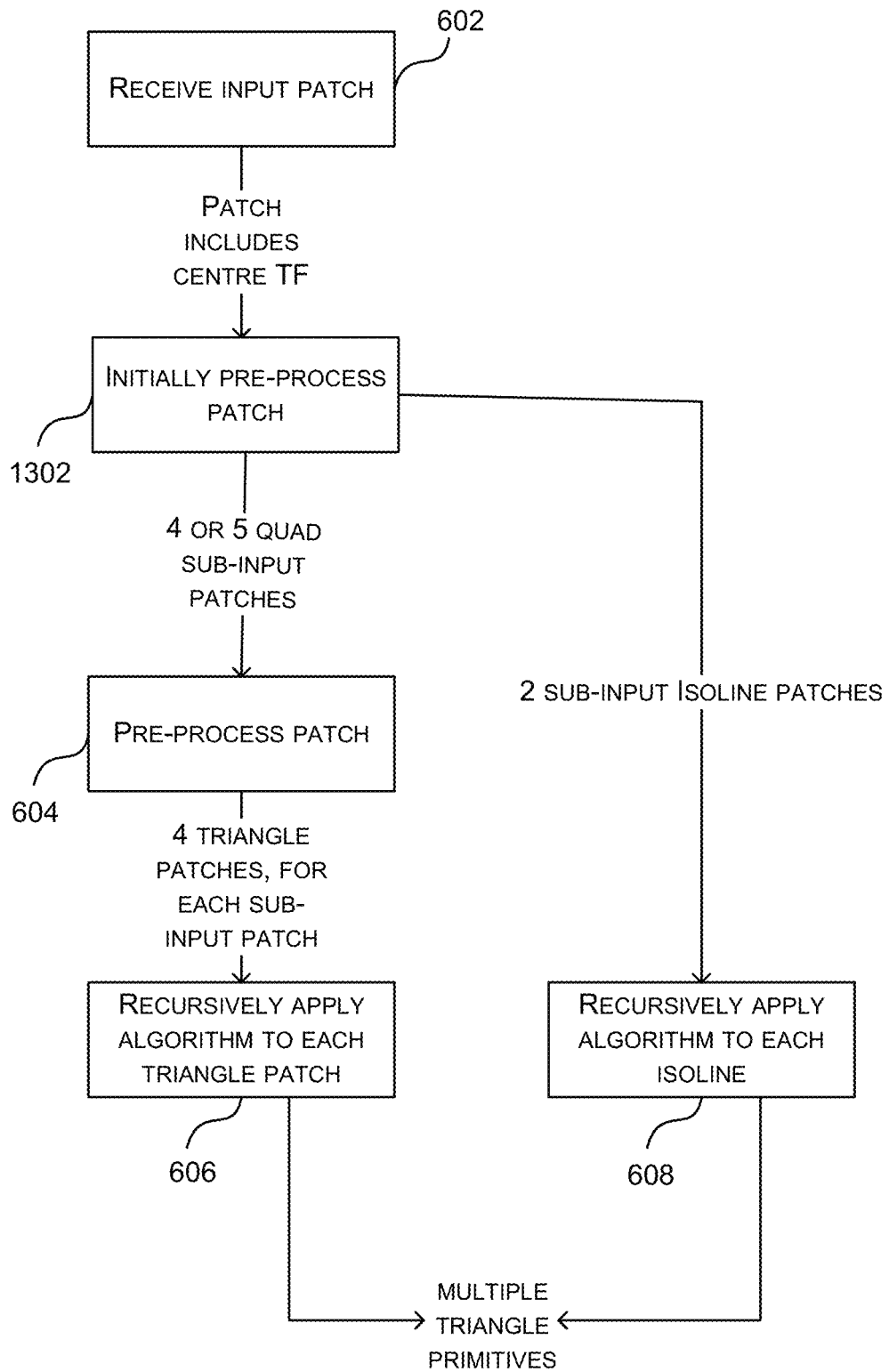
FIG. 13 is a flow diagram of a variation on the method shown in FIG. 6.

It may sometimes be desirable to allow a user to specify a centre TF for a patch that differs in LOD from the vertex TFs of the corners of the patch, particularly in animation. This could, for example, be used to better approximate the height map associated with a texture over a quad or triangle patch, for example if the map had a very sharp jump in the middle in the case of a creature's spike. FIG. 13 shows a variation on the method of FIG. 6 (as described above) which adds a further, optional, pre-processing stage (block 1302) which enables use of centre TFs for quad or triangle patches. As shown in FIG. 13, this additional pre-processing stage (in block 1302) is implemented prior to the pre-processing stage (in block 604) described above and divides the input patch (which may be a quad or triangle). Unlike the original pre-processing stage (block 604), the additional pre-processing stage (block 1302) may also be applied to isolines; however it is less useful in this context. In the case of isolines, the isoline is sub-divided and the newly added middle vertex is allocated the centre TF. The sub-division then proceeds as described above on the two sub-isolines (e.g. LEFT-MID and MID-RIGHT).

Figure 14:
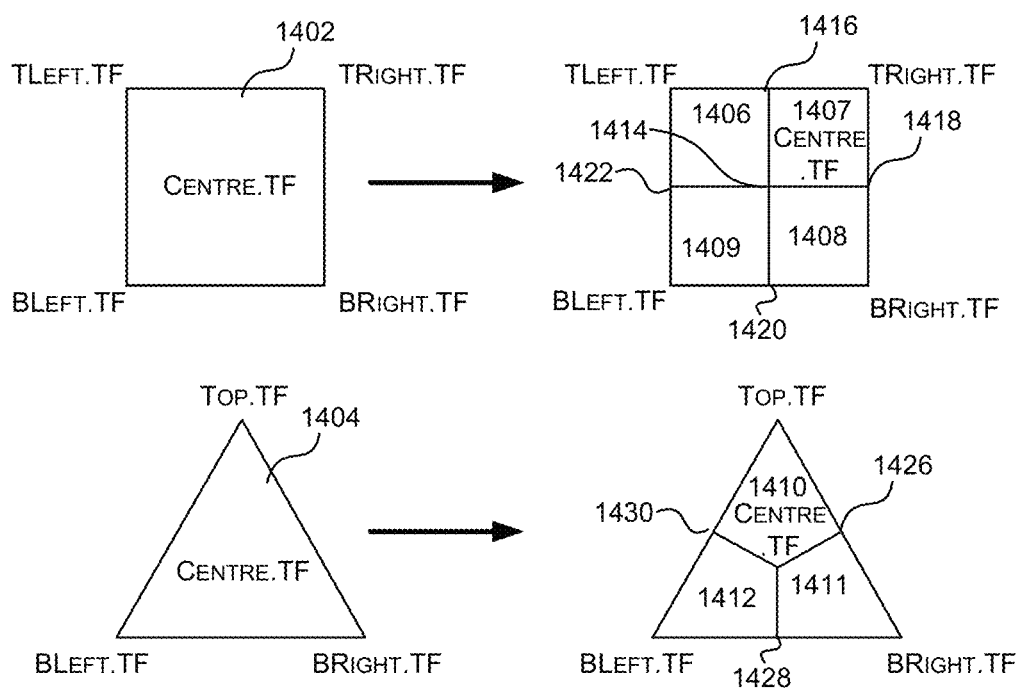
FIG. 14 is a schematic diagram illustrating the method of FIG. 13.
Figure 15:
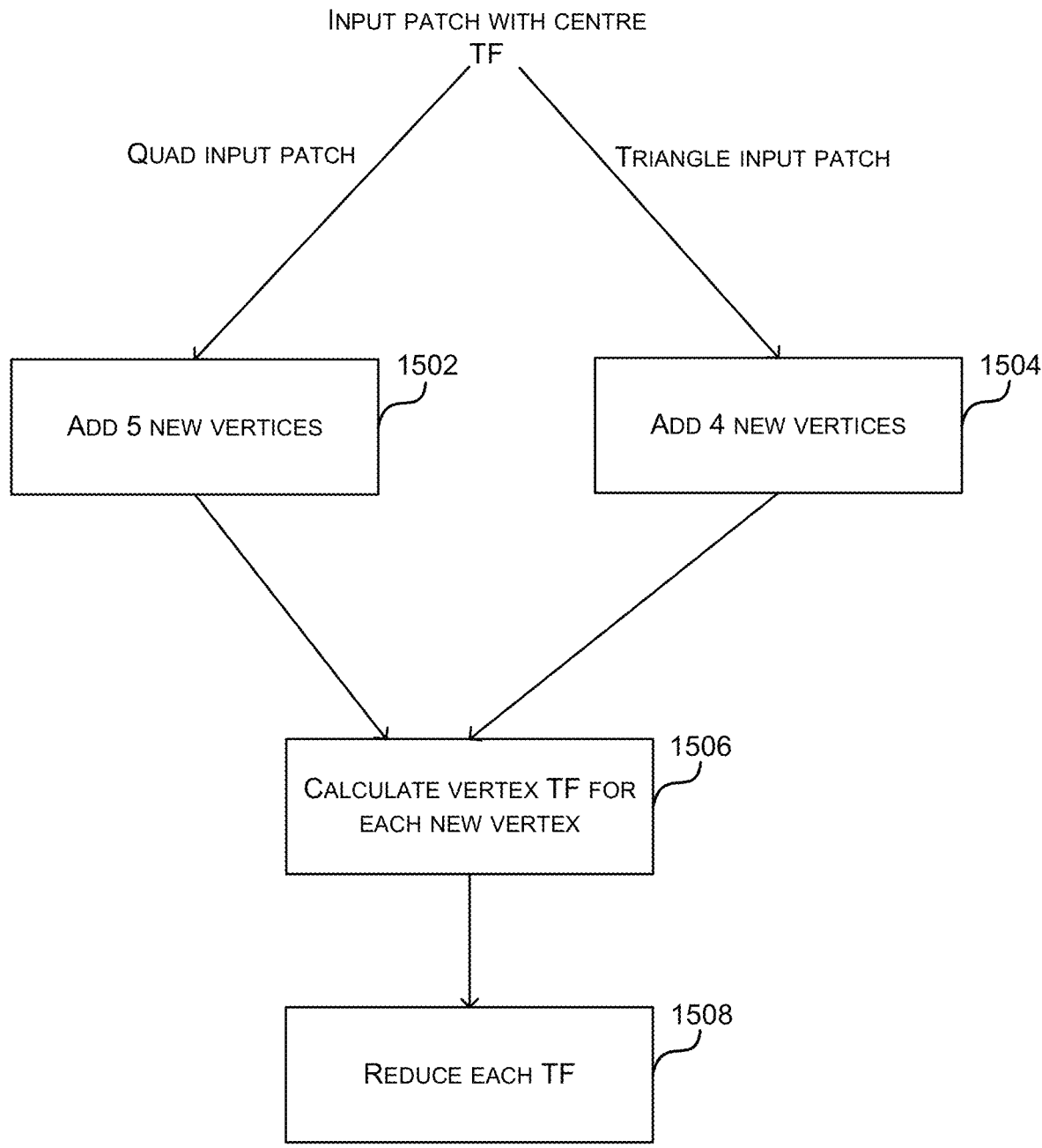
FIG. 15 is a flow diagram of the additional pre-processing stage of the method of FIG. 13.

The additional pre-processing stage (block 1302) can be described with reference to the FIGS. 14 and 15. FIG. 14 shows schematic diagrams of the application of the stage to a quad input patch 1402 or a triangle input patch 1404 and FIG. 15 shows a flow diagram of the additional pre-processing stage. With centre tessellation factors enabled, the user must supply to the tessellator a Centre TF per patch as well as the vertex TFs for each corner vertex (three for a triangle patch and four for a quad patch).

As shown in FIG. 14, the additional pre-processing stage divides a quad input patch 1402 into four quad patches 1406-1409 and a triangle input patch 1404 into three quad patches 1410-1412. To achieve this, pre-processing the quad input patch 1402 requires adding five new vertices (block 1502): the centre vertex 1414 (shared by all four sub-domains 1406-1409) with the Centre TF, a mid-top vertex 1416, a mid-right vertex 1418, a mid-bottom vertex 1420 and a mid-left vertex 1422. Their tessellation factors are calculated (in block 1506) for each newly added vertex, by taking the MEAN(of the newly added vertex's adjacent corner TFs. In various examples the MEAN(function given by equation (14) may be used as it results in more consistent tessellation patterns; however, in other examples the arithmetic mean may be used.

Pre-processing a triangle input patch 1404 requires adding four new vertices (block 1504): the centre vertex 1424 (shared by all three sub-domains) with the centre TF, a mid-right vertex 1426, a mid-bottom vertex 1428 and a mid-left vertex 1430. Their tessellation factors (as calculated in block 1506) are given, for each newly added vertex, by taking the MEAN(of the newly added vertex's adjacent corner TFs. As described above, in various examples the MEAN( ) function given by equation (14) may be used as it results in more consistent tessellation patterns; however, in other examples the arithmetic mean may be used.

The last stage of the additional pre-processing stage (block 1508) reduces each tessellation factor and in various examples, each TF is reduced by 2*INTERVAL. This reduction of the TFs (prior to input to the original pre-processing stage of block 604) ensures that the correct number of sub-divisions is made on each boundary edge of the patch and to indicate that tessellation has occurred.

Figure 16:
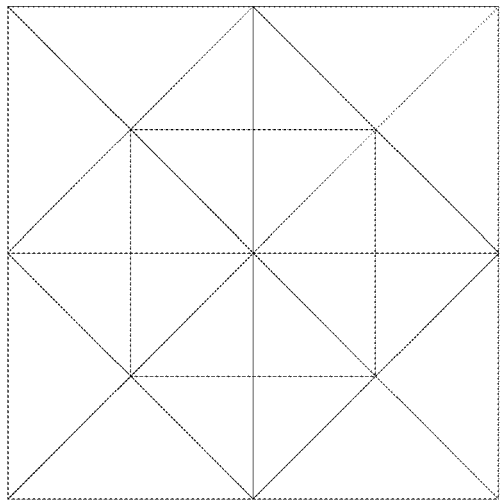
FIG. 16 shows example results obtained using the method of FIG. 13.
Figure 16:
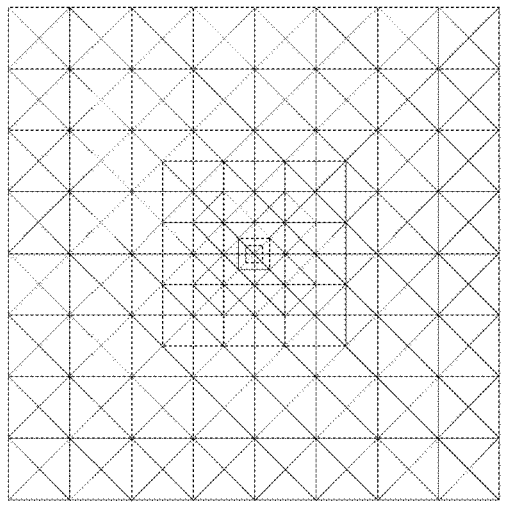
Figure 16:
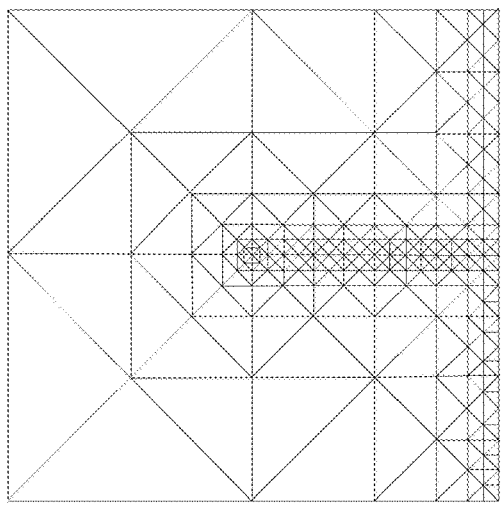
Figure 16:
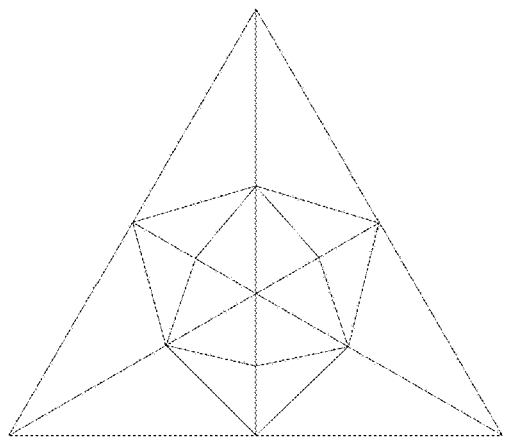
Figure 16:
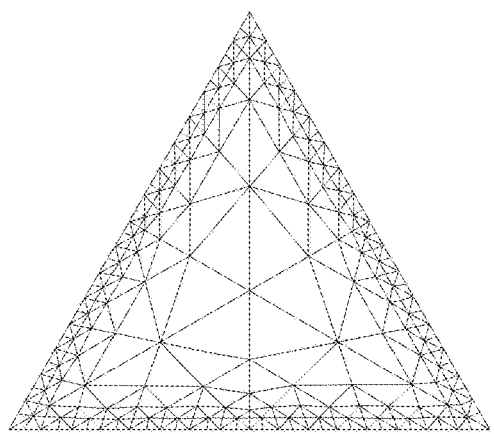
Figure 16:
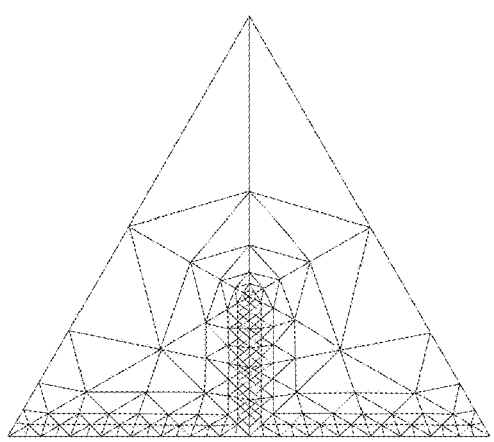

Having sub-divided the original input patches into three or four quad patches, in the additional pre-processing stage (block 1302), these three or four quad patches (with their vertex TFs as calculated in block 1508) are input to the original pre-processing stage (block 604) as if they were original input patches and the method proceeds as described above. FIG. 16 shows various example tessellations which may be obtained using the method of FIG. 13.

Due to the fact that the additional pre-processing stage (block 1302 and FIG. 15) sub-divides each domain edge at least once, even with TFs of 0.0, any single connected mesh should be tessellated either completely with or without centre TFs to ensure no cracking can occur (i.e. all patches in the single connected mesh should use the same method, i.e. they should all use the method of FIG. 6 or the method of FIG. 13 and not have some input patches using the method of FIG. 6 and others using the method of FIG. 13).

Where the example tessellation method described above is used in combination with displacement factors (as described with reference to FIGS. 3-5 above) the combined method may address many or all of the following problems which arise in known tessellation methods:

- No snapping—using the first example tessellation method, geometry is added by small increments as tessellation factors increase to produce a smooth transition. This helps with the prediction of rendering times.
- No popping—using the first example tessellation method, new vertices are introduced at the correct domain space coordinate and displacement factors may be used to slowly perturb them into the correct target state, as a result there are no popping artefacts due to instantaneous changes in vertex member values.
- No cracking—as demonstrated above, the first example tessellation method produces no T-junctions either within a domain or along the boundary of a domain.
- No swimming—each vertex that is introduced by the tessellator maintains its domain space position as tessellation factors increase and hence there are no "swimming" artefacts.

No over/under tessellation—an integer vertex tessellation factor t at each end of an edge corresponds to $2^t$ sub-divisions. Also, an average vertex tessellation factor of t on a quad approximately corresponds to $2^{2t}$ vertices and twice that many primitives which is minimal. Similarly a triangle patch corresponds to $$\frac{3}{4}2^{2t}$$

vertices and twice as many primitives.

No thin triangles—as described above the improved tessellation method only produces four (or fewer) classes of triangle per patch and this bounds the minimum of the Root Area to Perimeter Ratio per patch.

Space/time complexity—the algorithm is recursive (as shown in FIG. 6) and each sub-domain/patch can be treated independently which supports substantial parallelism. Input vertices require an extra fixed point value for the vertex tessellation factor and output vertices may require an extra fixed point displacement factor as well as its two "parent" domain space coordinates.

An example of the requirements of the combined method in an example implementation is given below:

| Step | Operation | Sub Op | Sub Op | # | Parameter Types | Time/Space Complexity |
|---|---|---|---|---|---|---|
| Is LEFT.TF > THES or RIGHT.TF > THRES | Comparison | | | 2 | Fixed Point | O(1) |
| Form new vertex MID as average of LEFT and RIGHT | Arithmetic Mean | | | 1 | Fixed and Floating Point | O(1) |
| | Assignment of parent domain space coordinates | | | 4 | Fixed Point | O(1) |
| | MEAN( ) of tessellation factors | | MIN( ) | 2 | Fixed Point | O(1) |
| | | | AVG( ) | 1 | Fixed Point | O(1) |
| | | | Addition | 1 | Fixed Point | O(1) |
| | Calculate DF's | G( ) | MAX( ) | 1 | Fixed Point | O(1) |
| | | | Comparison | 2 | Fixed Point | O(1) |
| | | | Subtraction | 1 | Fixed Point | O(1) |
| | | | Division | 1 | Fixed Point | O(1) |
| Form Patch ½ | Assign Vertices | | | 3 | Vertex | O(1) |
| Add Patch to Buffers | Add Vertices to Output Vertex Buffer | | | 3 | Vertex | O(α(M)) |
| | Add Indices to Output Index Buffer | | | 3 | UINT | O(1) |

In the above table the extra vertex members required for the proposed method are a Fixed Point Tessellation Factor for each input vertex and five Fixed Point values (a Displacement Factor and two domain space coordinates) for each output vertex. M is the current size of the output vertex buffer and α( ) is some function of M depending on how the buffer is structured. α( ) is typically something between log(M) and M.

In addition, the improved tessellation method described herein has, in various examples, the following further qualities:

No redundancy—above the threshold, no two sets of vertex tessellation factors produce the same mesh shape. This is guaranteed by the displacement factors.

Orientation independent—by splitting the patch into a fan of triangle patches with the middle vertex as the top of each (in the pre-processing stage, block 604), no choice is made on the orientation of the triangles, so the same tessellation will always be produced.

N-gons—the improved tessellation method may be easily adapted to support any polygon patch with N sides by splitting the patch into a fan of triangles (in a variation of the pre-processing stage 604). In each case, for an average tessellation factor t, the method would generate approximately $$\frac{N}{4}2^{2t}$$

vertices and twice as many primitives.

Using the improved tessellation method described herein to render the quad or tri domain with a texture, normal and heightmap under diffuse and specular lighting, no visible artifacts are seen by a user. For example there is no flickering of specular lighting which can appear with known tessellation methods. The domain grows gradually from fully untessellated at a distance (where the normal map gives the illusion of height) to fully tessellated with 8000 primitives. It is very difficult for a user to see any changes and in a gameplay setting nothing would be seen at all and the player would believe that the mesh had been tessellated the entire time.

Figure 17:
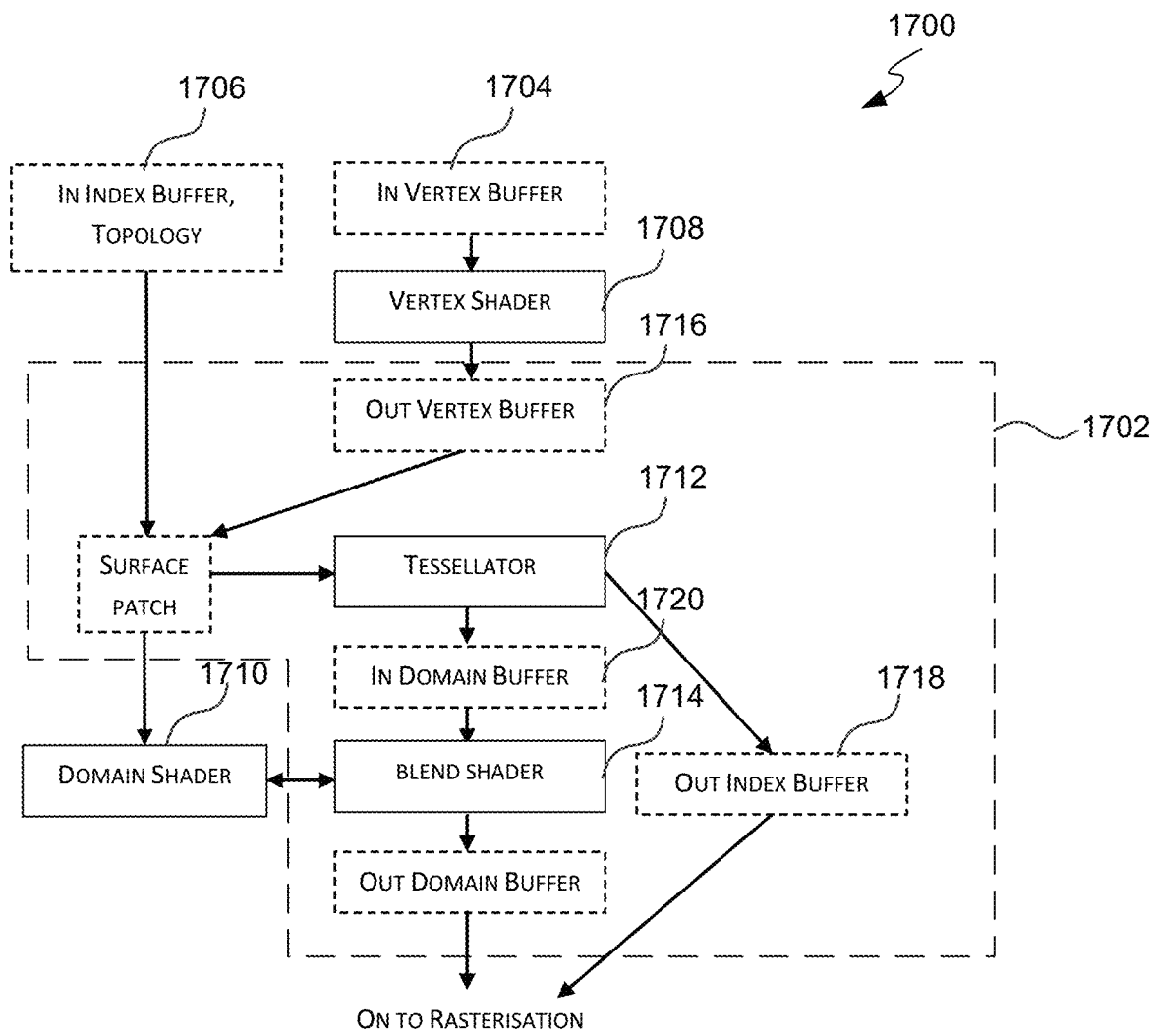
FIG. 17 is a schematic block diagram of an example improved GPU pipeline.

The combination of the example tessellation method (described above with reference to FIGS. 6-16) and displacement factors may be implemented within a GPU pipeline 1700 such as that shown in FIG. 17 where buffers are shown as boxes with dotted outlines and functions are shown as boxes with solid outlines. The arrows demonstrate the flow of vertex/surface-patch information in the system. Everything outside the large dotted box 1702 is defined by the user and everything inside the large dotted box 1702 is hidden from the user.

The user inputs a vertex buffer 1704 and index buffer 1706 (with a topology explaining how to build patches/surface-patches from the indices) and defines a Vertex Shader 1708 and a Domain Shader 1710 (e.g. as in known systems).

Hidden from the user are the Tessellator 1712 and the Blend Shader 1714 which may both be implemented in hardware. A surface-patch is formed from the In Index Buffer, the Topology and the Out Vertex Buffer. The Tessellator takes the vertex tessellation factors from the corner control points of the surface-patch (as calculated by the vertex shader). It tessellates the domain (given by the topology) in domain space using these vertex tessellation factors. It outputs the full list of domain space coordinates with displacement factors and each new vertex is constructed in the Blend Shader using these values along with the surface-patch and the Domain Shader. The Blend Shader outputs each new vertex which is appended to the Out Domain Buffer. Also the Tessellator outputs the Out Index Buffer (either a triangle, clockwise or anticlockwise or line topology) to be passed on to the rasterization stage.

As described above, the vertex shader 1708 performs per-vertex calculations on the current vertex which is fed into it and has no knowledge of the mesh topology. For each vertex from the vertex buffer inputted, the vertex shader will output exactly one vertex (not necessarily of the same type). Normally vertex shader inputs will contain members such as local position, normal, tangent and texture coordinate and its outputs will usually contain world position, normal, tangent, texture coordinate and must contain a tessellation factor which will be passed to the tessellator 1712. Firstly the shader will transform the vertex into world space and apply any other linear transforms. Then it will calculate a per-vertex tessellation factor, for example as a function of its distance from the camera.

After the Vertex Shader a surface-patch will be formed using the Out Vertex Buffer 1716 and the In Index Buffer 1706 (along with its Topology). The surface-patch's vertex tessellation factors will be passed to the Tessellator 1712 and it will tessellate the appropriate domain ("QUAD", "TRI" or "ISOLINE") depending on the number of factors given (e.g. using the methods described above with reference to FIGS. 6-16). The Tessellator will produce the domain space coordinates and displacement factor for each new vertex and will pass them onto the domain shader. It will also generate a list of indices determining each primitive (which must be offset by the current length of the Out Domain Buffer) which will be appended to the Out Index Buffer.

The domain shader 1710 is called from the blend shader 1714 and takes as input a domain space location (u, v). Also the domain shader takes as input all surface-patch information and outputs a full vertex structure. The domain shader uses the surface-patch control points and the domain space coordinates to build the new vertices. For normal tessellation this would simply be linearly interpolating the values of the patch's corner vertices. Alternatively a Bezier Surface may be used to determine the vertex's position/normal or Displacement Mapping could be used by sampling a texture.

The blend shader 1714 'blends' the vertices produced by the tessellator 1712 using the displacement factors (also generated by the tessellator 1712) and methods described above with reference to FIGS. 4 and 5. The blend shader 1714 uses the domain shader 1710 and the domain shader 1710 tells the blend shader 1714 how each member of the vertex structure should be calculated in the interior of a domain. The blend shader 1714 is executed once per generated vertex and takes as input a domain space location u, v for the vertex as well as two parent domain space coordinates (for the two parent vertices) and a displacement factor. Also the current surface-patch will be fed in to the blend shader. The blend shader 1714 uses the surface-patch control points and the domain space coordinates to build the vertices: child and two parents, and then each member of the output vertex is calculated as described above with reference to FIGS. 3-5 (i.e. by interpolating between the child and the average of the two parents). Alternatively, to prevent repeating calculations in order to identify the parent vertices, the vertices could be suitably ordered (e.g. such that each vertex with a DF<1 follows its parent vertices in the buffer) and parent vertices cached within the blend shader 1714 so that their target states are available when the child vertex is fed into the blend shader. However this would use much more memory.

After the blend shader 1714 has run for each generated vertex in the patch, the vertices are passed on to the rasterizer along with the out index buffer 1718 where each primitive will be processed.

Although FIG. 17 shows a single blend shader 1714, in some implementations there may be more than one blend shader, e.g. one blend shader for all vertices which have two parents (i.e. most vertices) and one blend shader for those vertices which have three parents (e.g. the middle vertex of a triangle patch, as shown in FIG. 7). The differences of this second blend shader and the general blend shader is that it takes in three parent domain space coordinates (which will be (0,0,1), (1,0,0) and (0,1,0) in barycentric coordinates) and the interpolation is between the domain shader result of each of these three coordinates. The interpolation parameters are (1/3, 1/3) in barycentric coordinates.

Where the displacement factor is 1, the blend shader 1714 reduces to the domain shader 1710 as no interpolation is required and in practice the majority of the vertices will have df=1. By checking if the value of the displacement factor is 1 prior to performing any interpolation, the computation time can be reduced significantly. As described above, the corner vertices and the center vertex of an input quad patch will have a fixed df=1.

The pipeline shown in FIG. 17 is highly parallelizable. The vertex shader 1708 requires no global information about the mesh and only needs the current vertex. Hence every vertex in the In Vertex Buffer 604 can be processed in parallel. Similarly once a patch/surface-patch has been formed from the In Index Buffer, Topology 1706 and the Out Vertex Buffer 1716 it is a self-contained unit and the processing by the Tessellator 1712 and Blend Shader 1714 can be done independently. This significantly reduces the execution time. Additionally, each vertex generated by the tessellator per patch can also be fed through the Blend Shader 1714 separately which offers another level of parallelism.

The example tessellation method itself is highly parallelizable (as described above). Each triangle patch can be sub-divided independently as long as copies of vertices are made for each thread (to ensure tessellation factors are only decreased once). The method also is very efficient in terms of physical space in hardware. After set-up (i.e. the pre-processing steps described above) for each of the three domains (three small areas of hardware) each triangle patch or line produced is fed into the same (very small) block of hardware. If this was implemented with no parallel architecture this would be a total of five small areas on hardware.

The pipeline also does not change the user's interface significantly which, as with known pipelines, consists of implementing a vertex shader 1708 and a domain shader 1710 and so the new pipeline 1700 could easily be used with existing software (with only minimal changes required to that existing software such that a tessellation factor is assigned to each vertex in the vertex shader 1708). Furthermore, some of the shaders that are required by known pipelines (e.g. Hull shaders) are not required and may be left as optional which reduces the effort required by the user.

As described above, the blend shader 1714, whilst referred in a similar manner to the vertex and domain shaders, is not implemented by the user and instead may be implemented in hardware to boost performance. As described above, the tessellator 1712 may also be implemented in hardware.

Figure 18:
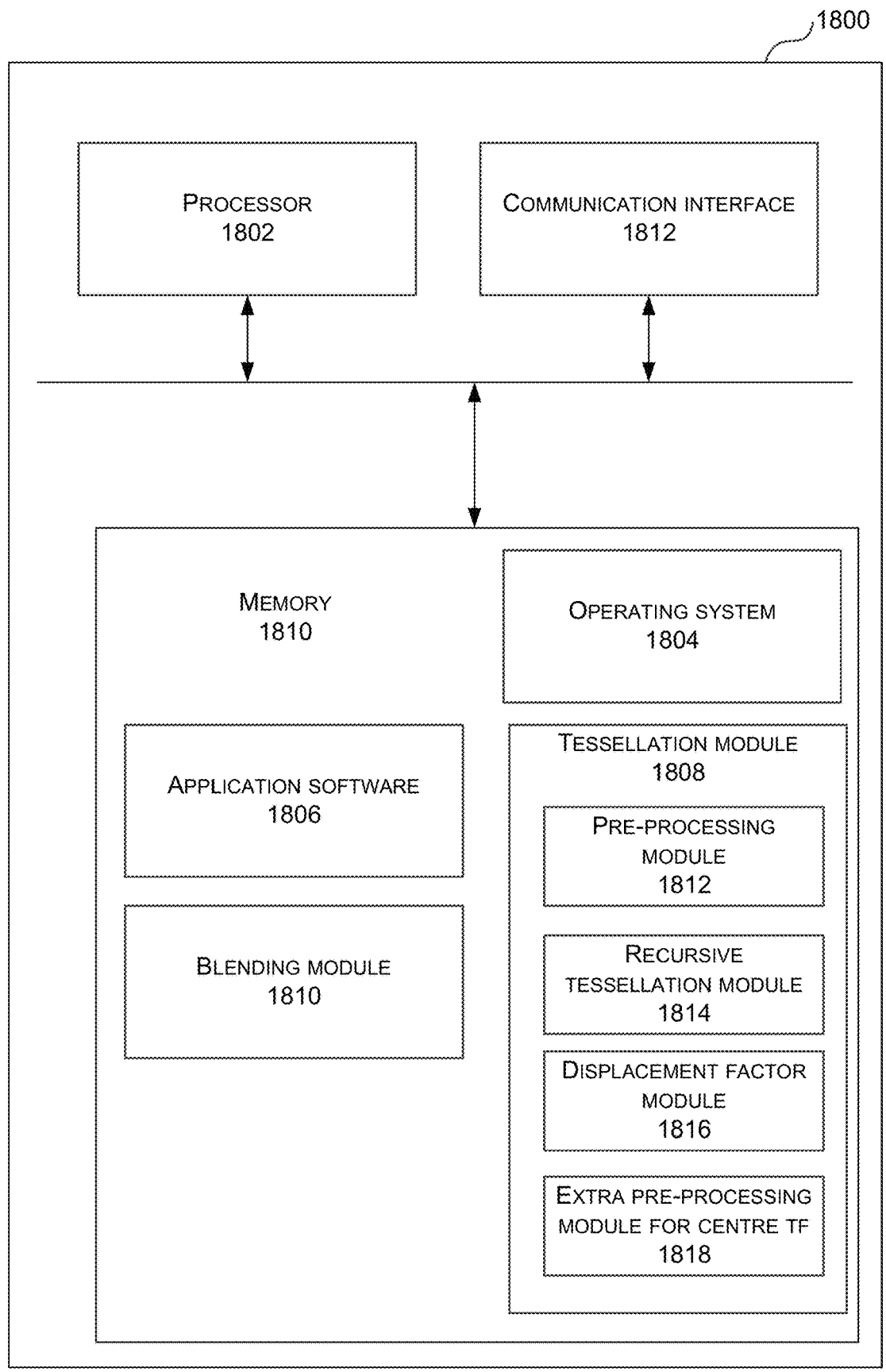
FIG. 18 illustrates various components of an exemplary computing-based device which may be implemented as any form of a computing and/or electronic device, and which may be configured to implement the improved tessellation method described herein.

The improved tessellation method described above may alternatively be implemented in software (or a combination of software and hardware). FIG. 18 illustrates various components of an exemplary computing-based device 1800 which may be implemented as any form of a computing and/or electronic device, and which may be configured to implement the tessellation methods described above.

Computing-based device 1800 comprises one or more processors 1802 which may be microprocessors, controllers or any other suitable type of processors for processing computer executable instructions to control the operation of the device in order to perform the improved tessellation method described above. In some examples, for example where a system on a chip architecture is used, the processors 1802 may include one or more fixed function blocks (also referred to as accelerators) which implement a part of the improved tessellation method in hardware (rather than software or firmware). Platform software comprising an operating system 1804 or any other suitable platform software may be provided at the computing-based device to enable application software 1806 to be executed on the device and the application software may include a tessellation module 1808 and a blending module 1810.

The tessellation module 1808 may, for example, comprise a pre-processing module 1812 (which implements block 604 of FIG. 6 or 13), a recursive tessellation module 1814 (which implements block 606 and/or 608 of FIG. 6 or 13) and a displacement factor module 1816 which calculates displacement factors (e.g. implementing block 306 of FIG. 3). The tessellation module 1808 may, in various examples, comprise a further module 1818 which performs the initial pre-processing where a center TF is used (which implemented block 1302 of FIG. 13).

The blending module 1810 'blends' the vertices produced by the tessellation module 1808 using the displacement factors (also generated by the tessellation module 1808) and methods described above with reference to FIGS. 4 and 5.

The computer executable instructions may be provided using any computer-readable media that is accessible by computing based device 1800. Computer-readable media may include, for example, computer storage media such as memory 1810 and communications media. Computer storage media (i.e. non-transitory machine readable media), such as memory 1810, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 1810) is shown within the computing-based device 1800 it will be appreciated that the storage may be distributed or located remotely and accessed via a network or other communication link (e.g. using communication interface 1812).

The computing-based device 1800 may also comprise an input/output controller arranged to output display information to a display device which may be separate from or integral to the computing-based device 1800. The display information may provide a graphical user interface. The input/output controller may also be arranged to receive and process input from one or more devices, such as a user input device (e.g. a mouse or a keyboard). In an embodiment the display device may also act as the user input device if it is a touch sensitive display device. The input/output controller may also output data to devices other than the display device, e.g. a locally connected printing device.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor of a receiver as described in the examples herein or to generate a manifestation of a processor configured to perform a method as described in the examples herein. The manifestation of a processor could be the processor itself, or a representation of the processor (e.g. a mask) which can be used to generate the processor.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A method of performing tessellation in a computer graphics system, the method comprising:
    performing tessellation on one or more input patches to generate a plurality of primitives defined by vertices, the tessellation comprising adding one or more new child vertices and calculating a displacement factor for each newly added child vertex; and
    generating a world space parameter for each vertex by modifying a target world space parameter for a child vertex using the displacement factor for the child vertex and world space parameters for parent vertices of the child vertex;
    wherein the world space parameter is used for rendering objects in a scene.

2. The method of claim 1, wherein the newly added child vertex is added at a position on an edge connecting two existing vertices, the two existing vertices being the parent vertices for the child vertex, and wherein the displacement factor for the newly added vertex is calculated based on the vertex tessellation factors of the two parent vertices and/or the child vertex.

3. The method according to claim 1, wherein the displacement factor for the newly added vertex is calculated based on the vertex tessellation factors of the two parent vertices and not based on the vertex tessellation factors for the child vertex.

4. The method according to claim 1, wherein the displacement factor for a vertex takes a value in a range between a minimum value and a maximum value dependent upon a current level of detail.

5. The method according to claim 1, wherein the modified target world space parameter is used for rendering an input patch.

6. The method according to claim 1, wherein the newly added child vertex bisects the edge between the two parent vertices.

7. The method according to claim 6, wherein calculating a displacement factor for each newly added vertex comprises:
calculating the displacement factor for a vertex as a function of the vertex tessellation factors of the parent vertices of the vertex and/or the child vertex;
wherein each displacement factor calculated is in a range between a minimum value of displacement factor and a maximum value of displacement factor.

8. The method according to claim 7, further comprising:
setting a displacement factor for each corner vertex in the one or more input patches to the maximum value of displacement factor.

9. The method according to claim 7, wherein the modified target world space parameter is used in rendering an input patch in a display space of said system and wherein as a level of detail of the rendering changes, the displacement factor for a vertex changes.

10. The method according to claim 9, wherein as the level of detail increases, the displacement factor for a vertex increases until it is equal to the maximum value of displacement factor.

11. The method according to claim 9, wherein as the level of detail decreases, the displacement factor for a vertex decreases until it is equal to the minimum value of displacement factor.

12. The method according to claim 11, wherein as the level of detail decreases, a vertex is removed if the displacement factor of the vertex is equal to the minimum value of displacement factor.

13. A graphics processing unit comprising:
a tessellator arranged to receive data defining each corner vertex in one or more input patches, and comprising logic arranged to perform tessellation on the one or more input patches using vertex tessellation factors to generate and output a plurality of primitives defined by vertices, the tessellation comprising adding one or more new child vertices, and wherein the tessellator further comprises logic arranged to calculate a displacement factor for each newly added child vertex; and
a blend shader arranged, for each child vertex, to modify a received target world space parameter for the child vertex using the displacement factor for the child vertex and the world space parameters for parent vertices of the child vertex;
wherein the world space parameters are used for rendering objects in a scene.

14. The graphics processing unit according to claim 13, wherein the received data defining each corner vertex in one or more input patches includes a vertex tessellation factor for each corner vertex.

15. The graphics processing unit according to claim 13, wherein the blend shader is arranged, for each child vertex, to modify a received target world space parameter for the child vertex using the displacement factor for the child vertex and the world space parameters for the parent vertices of the child vertex by:
generating a starting state of the world space parameter for the child vertex by interpolating between the world space parameters for the parent vertices; and
interpolating, using the displacement factor for the child vertex, between the starting state of the world space parameter for the child vertex and the target world space parameter for the child vertex.

16. The graphics processing unit according to claim 15, further comprising a domain shader arranged to calculate target world space parameters for the child vertex and the parent vertices and to output the target world space parameters to the blend shader.

17. The graphics processing unit according to claim 13, further comprising a vertex shader arranged to calculate the vertex tessellation factor for each corner vertex and to output the vertex tessellation factors to the tessellator.

18. The graphics processing unit according to claim 13, further comprising an out vertex buffer and wherein outputting the vertex tessellation factors to the tessellator comprises storing the vertex tessellation factors in the out vertex buffer.

19. A non-transitory computer readable storage medium having stored thereon a computer dataset description that, when processed, causes an integrated circuit manufacturing system to generate a graphics pipeline configured to:
perform tessellation on one or more input patches to generate a plurality of primitives defined by vertices, the tessellation comprising adding one or more new child vertices and calculating a displacement factor for each newly added child vertex; and
generate a world space parameter for each vertex by modifying a target world space parameter for a child vertex using the displacement factor for the child vertex and world space parameters for parent vertices of the child vertex;
wherein the world space parameter is used for rendering objects in a scene.

20. The non-transitory computer readable storage medium according to claim 19, wherein the graphics pipeline is configured to modify the target world space parameter for a child vertex using the displacement factor for the child vertex and the world space parameters for the parent vertices of the child vertex by:
generating a starting state of the world space parameter for the child vertex by interpolating between the world space parameters for the parent vertices; and
calculating a modified world space parameter for the child vertex based on the displacement factor for the child vertex, the starting state of the world space parameter for the child vertex and the target world space parameter for the child vertex.

* * * * *